US012040550B2

(12) United States Patent
Sazegar et al.

(10) Patent No.: US 12,040,550 B2
(45) Date of Patent: Jul. 16, 2024

(54) CELL ROTATION AND FREQUENCY COMPENSATION IN DIODE DESIGNS

(71) Applicant: Kymeta Corporation, Redmond, WA (US)

(72) Inventors: Mohsen Sazegar, Kirkland, WA (US); Cagdas Varel, Seattle, WA (US); Hussein Esfahlani, Kirkland, WA (US); Seyed Mohamad Amin Momeni Hasan Abadi, Redmond, WA (US)

(73) Assignee: KYMETA CORPORATION, Redmond, WA (US)

( * ) Notice: Subject to any disclaimer, the term of this patent is extended or adjusted under 35 U.S.C. 154(b) by 317 days.

(21) Appl. No.: 17/713,042

(22) Filed: Apr. 4, 2022

(65) Prior Publication Data

US 2022/0320753 A1 Oct. 6, 2022

Related U.S. Application Data

(60) Provisional application No. 63/170,994, filed on Apr. 5, 2021.

(51) Int. Cl.
*H01Q 21/20* (2006.01)
*H01Q 13/10* (2006.01)

(52) U.S. Cl.
CPC ............. *H01Q 21/20* (2013.01); *H01Q 13/10* (2013.01)

(58) Field of Classification Search
CPC ........ H01Q 3/44; H01Q 13/10; H01Q 21/064; H01Q 21/20
See application file for complete search history.

(56) References Cited

U.S. PATENT DOCUMENTS

| | | | | |
|---|---|---|---|---|
| 9,887,455 | B2 * | 2/2018 | Sazegar | H01Q 3/34 |
| 2017/0170572 | A1 * | 6/2017 | Severson | H01Q 21/064 |

(Continued)

FOREIGN PATENT DOCUMENTS

| | | | |
|---|---|---|---|
| CN | 110380222 | A | 10/2019 |
| CN | 110718755 | A | 1/2020 |

OTHER PUBLICATIONS

International Preliminary Report on Patentability received for PCT Patent Application No. PCT/US2022/023515, mailed on Oct. 19, 2023, 7 pages.

(Continued)

*Primary Examiner* — Seokjin Kim
(74) *Attorney, Agent, or Firm* — Womble Bond Dickinson (US) LLP

(57) ABSTRACT

Antennas having iris and/or cell rotation and/or with frequency compensation in solid state device (e.g., diode) designs and methods of using the same are described. In some embodiments, the antenna comprises: an antenna aperture having a plurality of RF radiating antenna elements that each include an iris and a solid state device coupled across the iris, wherein the plurality of antenna elements are located in rings with orientation of each of the irises of the antenna elements in at least a portion of each ring rotated with respect to adjacent irises in the portion of each ring while orientation of corresponding solid state devices is uniform; and a controller coupled to control the array of RF radiating antenna elements to tune RF radiating antenna elements to generate one or more beams using the plurality of RF radiating antenna elements.

22 Claims, 16 Drawing Sheets

(56) References Cited

U.S. PATENT DOCUMENTS

| | | | | |
|---|---|---|---|---|
| 2017/0302004 | A1* | 10/2017 | Stevenson | H01Q 21/065 |
| 2018/0076521 | A1* | 3/2018 | Mehdipour | H01Q 5/335 |
| 2018/0159245 | A1 | 6/2018 | Chen et al. | |
| 2019/0379132 | A1* | 12/2019 | Pelletti | H01Q 9/0457 |
| 2020/0044326 | A1* | 2/2020 | Olfert | H01Q 21/0012 |
| 2021/0050671 | A1* | 2/2021 | Stevenson | H01Q 21/0012 |

OTHER PUBLICATIONS

Written Opinion of the International Searching Authority and International Search Report on the Patentability Application No. PCT/US2022/023515 Mailed Jul. 25, 2022, 9 pages.

* cited by examiner

CELL ROTATION AND FREQUENCY COMPENSATION IN DIODE DESIGNS

RELATED APPLICATION

The present application is a non-provisional application of and claims the benefit of U.S. Provisional Patent Application No. 63/170,994, entitled "Cell Rotations and Frequency Compensation in Varactor Designs," filed Apr. 5, 2021, which is incorporated by reference in its entirety.

FIELD OF THE INVENTION

Embodiments disclosed herein are related to wireless communication; more particularly, embodiments disclosed herein are related to unit cell placement and frequency compensation.

BACKGROUND

Flat-panel antennas have become more prevalent in satellite communication systems in recent years. Of these flat-panel antennas, electronically-scanned antennas such as metasurface antennas have emerged as a new technology for generating steered, directive beams from a lightweight, low-cost, and planar physical platform. Metasurface antennas may comprise metamaterial antenna elements that can selectively couple energy from a feed wave to produce beams that may be controlled for use in communication. These antennas are capable of achieving comparable performance to phased array antennas from an inexpensive and easy-to-manufacture hardware platform, and are also being used in in-vehicle solutions.

Some flat-panel electronically-steerable metamaterial antennas having radio-frequency (RF) radiating unit cells that include devices to tune the RF radiating unit cells. In some implementations, varactor diodes are used to tune the RF radiating unit cells.

SUMMARY

Antennas having iris and/or cell rotation and/or with frequency compensation in solid state device (e.g., diode) designs and methods of using the same are described. In some embodiments, the antenna comprises: an antenna aperture having a plurality of RF radiating antenna elements that each include an iris and a solid state device coupled across the iris, wherein the plurality of antenna elements are located in rings with orientation of each of the irises of the antenna elements in at least a portion of each ring rotated with respect to adjacent irises in the portion of each ring while orientation of corresponding solid state devices is uniform; and a controller coupled to control the array of RF radiating antenna elements to tune RF radiating antenna elements to generate one or more beams using the plurality of RF radiating antenna elements.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION OF THE PRESENT INVENTION

Figure 1:
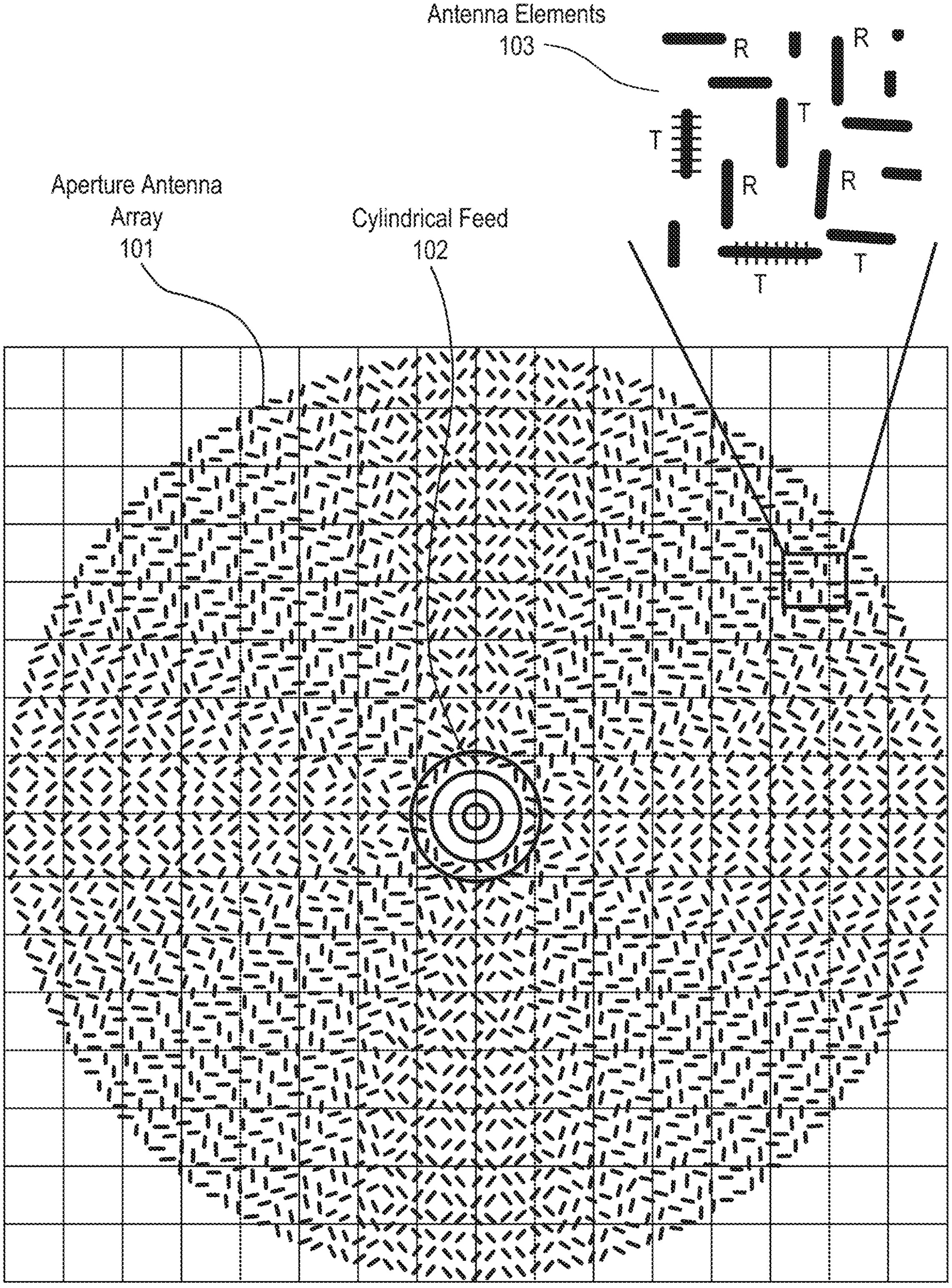
FIG. 1 illustrates the schematic of one embodiment of a cylindrically fed holographic radial aperture antenna.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Techniques disclosed herein allow diodes (e.g., varactor diodes, Schottky diodes, pin diodes, etc.) used as part of antenna elements (e.g., RF radiating unit cells) in an antenna aperture to have a uniform orientation (e.g., a horizontal orientation, a vertical orientation, etc.) while the antenna elements gradually change their orientation. This creates a mis-alignment between diode rotation and cell rotation. Allowing antenna elements to have a uniform orientation is particular useful during manufacturing when using traditional pick and place for diode placement which typically require that the diode orientation not change or only changes in discrete steps (e.g., 90 degrees).

Maintaining uniform orientation of diodes when antenna elements are placed with changes in rotation can cause a frequency shift for every antenna element (e.g., unit cell) because every antenna element will have a slight change in rotation when compared to the other antenna elements adjacent in the row (e.g., rings). Techniques are disclosed herein to allow the resonance frequency of individual antenna elements to be tuned to compensate for frequency shifts.

The following disclosure discusses examples of antenna embodiments, followed by embodiments of diode placement with uniform orientation with respect to rotated antenna elements (e.g., irises), and frequency compensation methods associated with individual antenna elements. Note that while the techniques disclosed herein are described terms of diodes, the techniques are applicable to other solid state devices and/or tuning elements used in antenna elements, such as, for example, but not limited to, transistors (e.g., MOSFETS, BJTs, MOS-capacitors, etc.).

Examples of Antenna Embodiments

Techniques described herein may be used with flat panel satellite antennas. Embodiments of such flat panel antennas are disclosed. The flat panel antennas include one or more arrays of antenna elements on an antenna aperture. In one embodiment, the antenna aperture is a metasurface antenna aperture, such as, for example, the antenna apertures described below. In one embodiment, the antenna elements comprise varactor diode-based antenna elements with diodes and varactors such as described above and described in U.S. Patent Application Publication No. 20210050671, entitled "Metasurface Antennas Manufactured with Mass Transfer Technologies," published Feb. 18, 2021. In one embodiment, the flat panel antenna is a cylindrically fed antenna that includes matrix drive circuitry to uniquely address and drive each of the antenna elements that are not placed in rows and columns. In one embodiment, the elements are placed in rings.

In one embodiment, the antenna aperture having the one or more arrays of antenna elements is comprised of multiple segments coupled together. When coupled together, the combination of the segments form closed concentric rings of antenna elements. In one embodiment, the concentric rings are concentric with respect to the antenna feed.

FIG. 1 illustrates the schematic of one embodiment of a cylindrically fed holographic radial aperture antenna. Referring to FIG. 1, the antenna aperture has one or more arrays 101 of antenna elements 103 that are placed in concentric rings around an input feed 102 of the cylindrically fed antenna. In one embodiment, antenna elements 103 are radio frequency (RF) resonators that radiate RF energy. In one embodiment, antenna elements 103 comprise both Rx and Tx irises that are interleaved and distributed on the whole surface of the antenna aperture. Such Rx and Tx irises, or slots, may be in groups of three or more sets where each set is for a separately and simultaneously controlled band. Examples of such antenna elements with irises are described in greater detail below. Note that the RF resonators described herein may be used in antennas that do not include a cylindrical feed.

In one embodiment, the antenna includes a coaxial feed that is used to provide a cylindrical wave feed via input feed 102. In one embodiment, the cylindrical wave feed architecture feeds the antenna from a central point with an excitation that spreads outward in a cylindrical manner from the feed point. That is, a cylindrically fed antenna creates an outward travelling concentric feed wave. Even so, the shape of the cylindrical feed antenna around the cylindrical feed can be circular, square or any shape. In another embodiment, a cylindrically fed antenna creates an inward travelling feed wave. In such a case, the feed wave most naturally comes from a circular structure.

In one embodiment, antenna elements 103 comprise irises (iris openings) and the aperture antenna of FIG. 1 is used to generate a main beam shaped by using excitation from a cylindrical feed wave for radiating the iris openings through tunable diodes, varactors, and/or solid state devices. In one embodiment, the antenna can be excited to radiate a horizontally or vertically polarized electric field at desired scan angles.

In one embodiment, each scattering element in the antenna system is part of a unit cell as described above. In one embodiment, the unit cell is driven by the matrix drive embodiments described above. In one embodiment, the diode/varactor in each unit cell has a lower conductor associated with an iris slot separated from an upper conductor associated with its tuning electrode (e.g., iris metal). The diode/varactor can be controlled to adjust the bias voltage between the iris opening and the patch electrode. Using this property, in one embodiment, the diode/varactor integrates an on/off switch for the transmission of energy from the guided wave to the unit cell. When switched on, the unit emits an electromagnetic wave like an electrically small dipole antenna. Note that the teachings herein are not limited to having unit cell that operates in a binary fashion with respect to energy transmission.

In one embodiment, the feed geometry of this antenna system allows the antenna elements to be positioned at forty-five-degree (45°) angles to the vector of the wave in the wave feed. Note that other positions may be used (e.g., at 40° angles). This position of the elements enables control of the free space wave received by or transmitted/radiated from the elements. In one embodiment, the antenna elements are arranged with an inter-element spacing that is less than a free-space wavelength of the operating frequency of the antenna. For example, if there are four scattering elements per wavelength, the elements in the 30 GHz transmit antenna will be approximately 2.5 mm (i.e., ¼ th the 10 mm free-space wavelength of 30 GHz).

In one embodiment, the two sets of elements are perpendicular to each other and simultaneously have equal amplitude excitation if controlled to the same tuning state. Rotating them +/−45 degrees relative to the feed wave excitation achieves both desired features at once. Rotating one set 0 degrees and the other 90 degrees would achieve the perpendicular goal, but not the equal amplitude excitation goal. Note that 0 and 90 degrees may be used to achieve isolation when feeding the array of antenna elements in a single structure from two sides.

The amount of radiated power from each unit cell is controlled by applying a voltage to the varactor diode using a controller. Traces to each varactor diode are used to provide the voltage to the varactor diode. The voltage is used to tune or detune the capacitance and thus the resonance frequency of individual elements to effectuate beam forming. The voltage required is dependent on the diode/varactor being used.

Diode Placement and Orientation

In some embodiments, the antenna aperture has RF radiating antenna elements that each include an iris and a varactor diode coupled across the iris, and the antenna elements are located in rings (or rows). The orientation of each iris of the antenna elements in each ring, or portion thereof, is rotated with respect to the adjacent irises in that ring while orientation of corresponding varactor diodes is uniform.

In some embodiments, the diodes in the antenna aperture have the following characteristics:

1) Single iris (slot) design for all receive (Rx) RF radiating antenna elements;

2) Single iris (slot) design for all transmit (Tx) RF radiating antenna elements;
3) Diodes are placed in two steps corresponding to two orientations and the diodes are not rotated during placement; this results in the diodes having a uniform orientation. In some embodiments, the diodes will land on the landing pads as long as they are within 15-20 degrees of the orientation.
4) Diodes have bonding pads that are all the same shape (e.g., rectangular bonding pads, circular bonding pads, etc.).

Note that the iris and their corresponding diodes in the antenna elements can be included in apertures having different configurations.

Figure 2B:
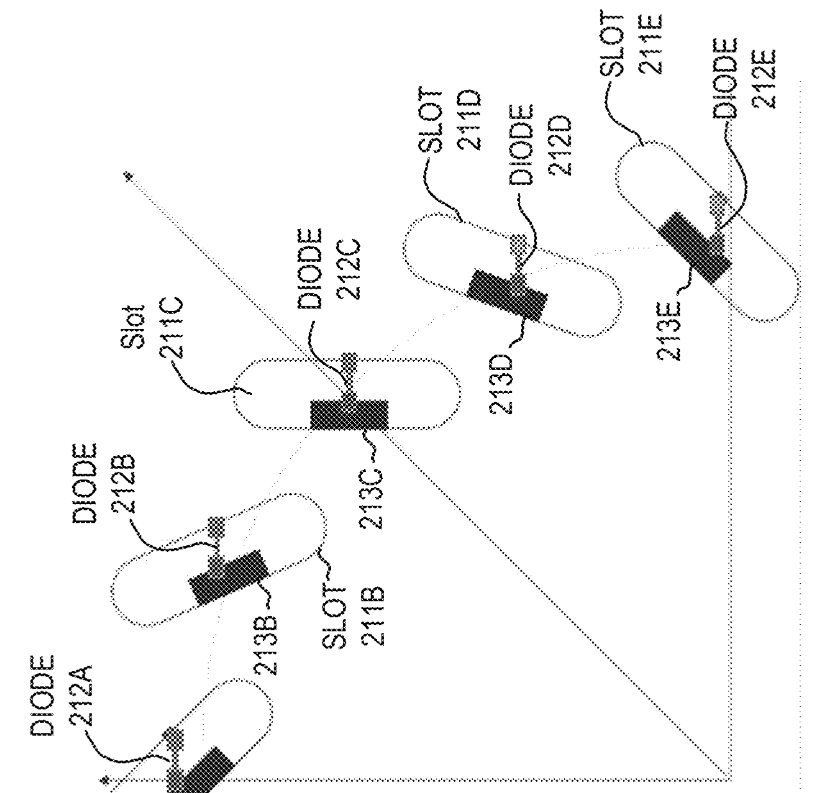
FIGS. 2A-2B illustrate two sets of slots, or irises, of antenna elements.
Figure 2A:
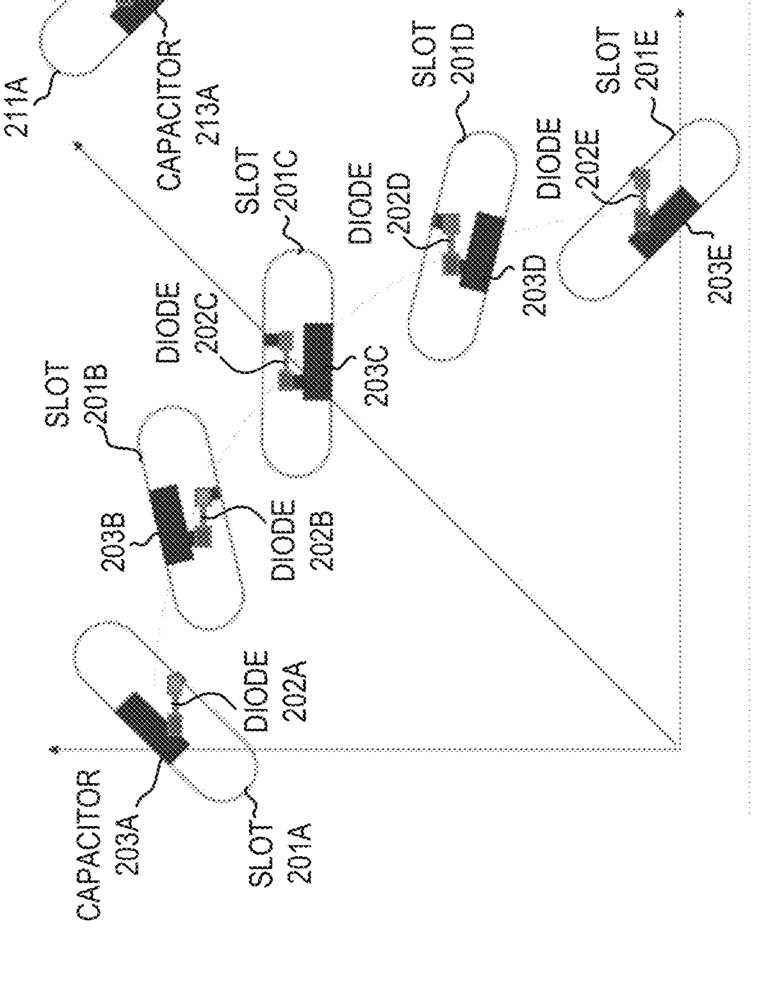

FIGS. 2A-2B illustrate two sets of slots, or irises of antenna elements. In some embodiments, the antenna elements, and their corresponding slots, are located or placed in rings. In some other embodiments, the antenna elements are placed in arrangements other than rings.

FIG. 2A illustrates one set of slots that has a +45-degree angle relative to the cylindrical feed wave impinging at the central location of each slot, while FIG. 2B illustrates the other set of slots has a −45-degree angle relative to the cylindrical feed wave impinging at the central location of each slot. Thus, the antenna array of RF radiating antenna elements is a slotted array that includes a first set of slots rotated +45 degrees relative to the cylindrical feed wave propagation direction and a second set of slots rotated −45 degrees relative to the propagation direction of the cylindrical feed wave. In some embodiments, all of the diodes are configured with a horizontal orientation. In some other embodiments, all of the diodes are configured with a vertical orientation. In yet some other embodiments, all of the diodes are configured with an orientation between horizontal and vertical.

Referring to FIG. 2A, five slots are shown, namely slots 201A-201E, as part of a ring of slots. Note that while only five slots are shown, many more slots are typically included in each row (e.g., see FIG. 1). Slot 201A includes diode 202A coupled in series with capacitor 203A to create a series connection across slot 201A. In some embodiments, the capacitor that is coupled or connected in series with a diode in FIG. 2A (as well as other figures, such as FIGS. 2B-7) comprises a tunable capacitor, such as, for example, an interdigital capacitor (IDC).

Slot 201B includes diode 202B coupled in series with capacitor 203B across slot 201B. Slot 201C includes diode 202C coupled in series with capacitor 203C across slot 201C. Slot 201D includes diode 202D coupled in series in with capacitor 203D across slot 201D, and slot 201E includes diode 202E coupled in series with capacitor 203E across slot 201E. As shown in FIG. 2A, all the diodes 202A-202E have a horizontal orientation, while the position of the slots 201A-201E gradually rotates with respect to the slots that are adjacent to it in the ring. That is, the slots are rotating while the diodes are all aligned with the horizontal axis.

Referring to FIG. 2B, five slots are shown, namely slots 211A-211E, as part of a ring of slots. Note that while only five slots are shown, more slots are typically included in each row (e.g., see FIG. 1). Slot 211A includes diode 212A coupled in series with capacitor 213A across slot 211A. Slot 211B includes diode 212B coupled in series with capacitor 213B to create a series connection across slot 211B. Slot 211C includes diode 212C coupled in series with capacitor 213C across slot 211C. Slot 211D includes diode 212D coupled in series with capacitor 213D across slot 211D, and slot 211E includes diode 212E coupled in series with capacitor 213E across slot 211E. Diodes 212A-212E have a horizontal orientation, while the position of slots 211A-211E gradually rotates with respect to the slots that are adjacent to it in the ring. That is, the slots are rotating while the diodes are all aligned with the horizontal axis.

Figure 3A:
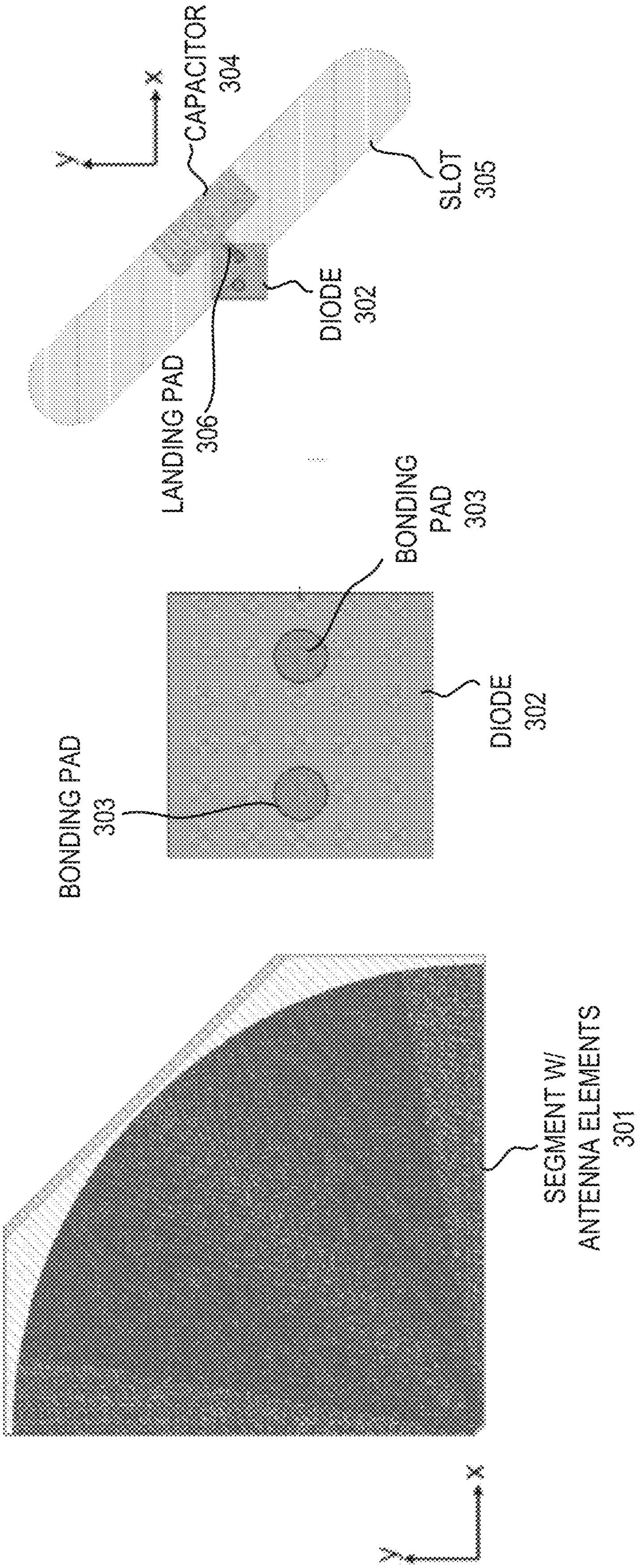
FIG. 3A illustrates an example of diode placement for RF radiating antenna elements of type A in an antenna aperture segment.

FIG. 3A illustrates an example of diode placement for RF radiating antenna elements of type A in an antenna aperture segment. The antenna aperture segment is used to form a circular antenna aperture when coupled, or otherwise combined, with other antenna aperture segments. In FIG. 3A, the element type-A have a rotation angle less than or equal to 135 degrees and greater than or equal to 45 degrees. Note that antenna apertures can have shapes that are not circular (e.g., square, oval, etc.). For more information on segmented antenna apertures, see U.S. Pat. No. 9,887,455, entitled "Aperture segmentation of a cylindrical feed antenna", issued Feb. 6, 2018. In FIG. 3A, the diode is in a horizontal orientation in an antenna element.

Referring to FIG. 3A, an antenna aperture segment 301 includes antenna elements. In segment 301, each of the antenna elements of type-A includes a diode 302 with a horizontal orientation. That is, in antenna aperture segment 301, regardless of the orientation of the slots, such as slot 305, diode 302 is in a horizontal orientation.

Diode 302 is coupled in series with capacitor 304 to create a series connection across slot 305 in the antenna element via bonding pads 303. As shown, bonding pads 303 are circular. However, in other embodiments, diode 302 can have bonding pads that are other shapes, such as, for example, rectangular, square, etc. One of bonding pads 303 is coupled to capacitor 304 via landing pad 306, while another landing pad (not shown) is below and coupled to the other bonding pad 303 of diode 302.

Figure 3B:
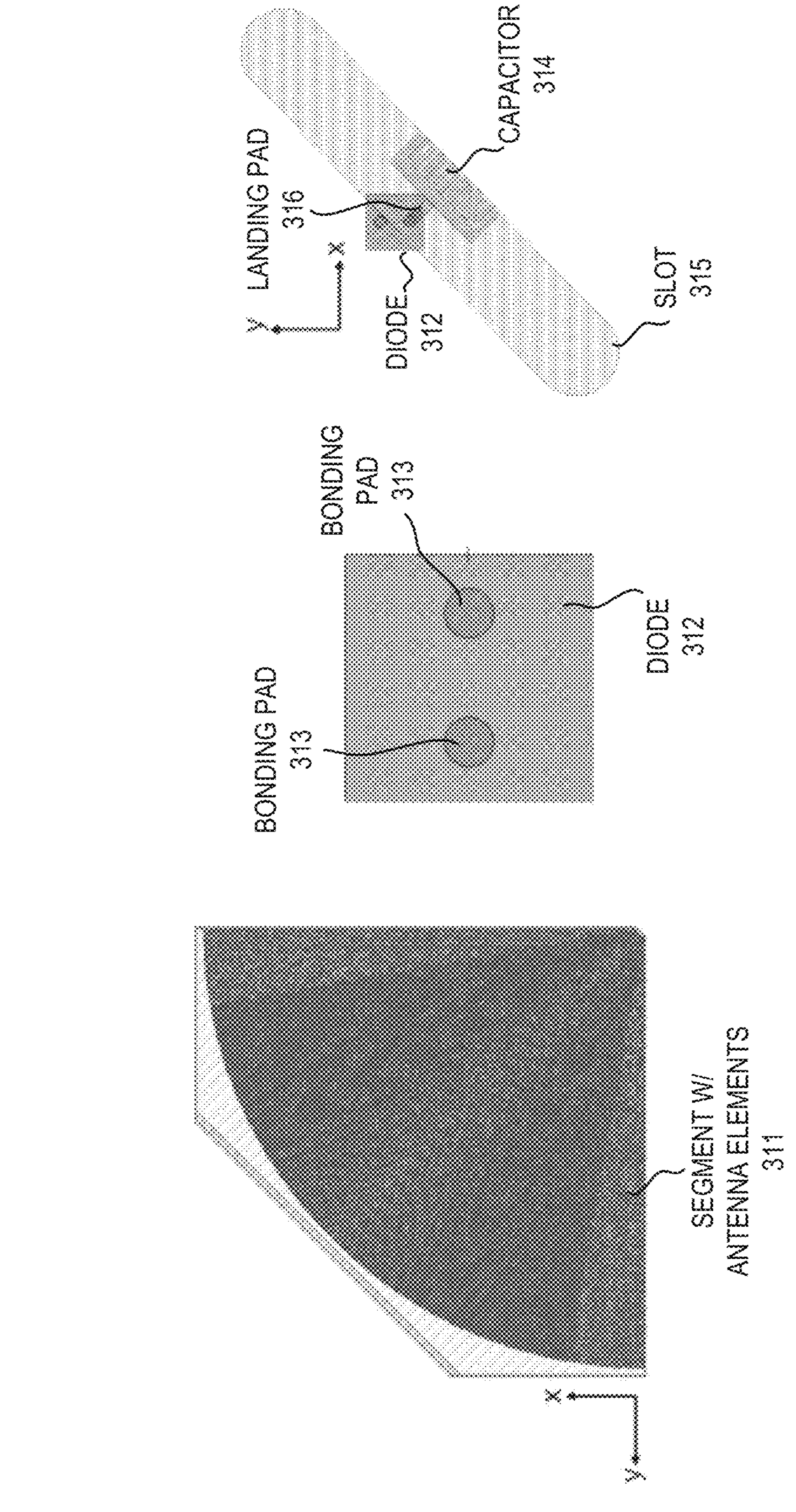
FIG. 3B illustrates an example of diode placement for RF radiating antenna elements of type B in an antenna aperture segment.

FIG. 3B illustrates an example of diode placement for RF radiating antenna elements of type B in an antenna aperture segment. As with FIG. 3A, the antenna aperture segment is used to form a circular antenna aperture when coupled, or otherwise combined, with other antenna aperture segments. In FIG. 3B, the element type-B have a rotation angle less than 45 degrees or greater than or equal to 135 degrees. Note that antenna apertures can have shapes that are not circular (e.g., square, oval, etc.). In FIG. 3B, the diode is in a vertical orientation in an antenna element.

Referring to FIG. 3B, an antenna aperture segment 311 includes antenna elements. In segment 311, each of the antenna elements of type-B includes a diode 312 with a horizontal orientation. That is, in antenna aperture segment 311, regardless of the orientation of the slots, such as slot 315, diode 312 is in a horizontal orientation.

Diode 312 is coupled in series with capacitor 314 to create a series connection across slot 315 in the antenna element via bonding pads 313. As shown, bonding pad 313 are circular. However, in other embodiments, diode 312 can have bonding pads that are other shapes, such as, for example, rectangular, square, etc. One of bonding pads 313 is coupled to capacitor 314 via landing pad 316, while another landing pad (not shown) is below and coupled to the other bonding pad 313 of diode 312.

Figure 4A:
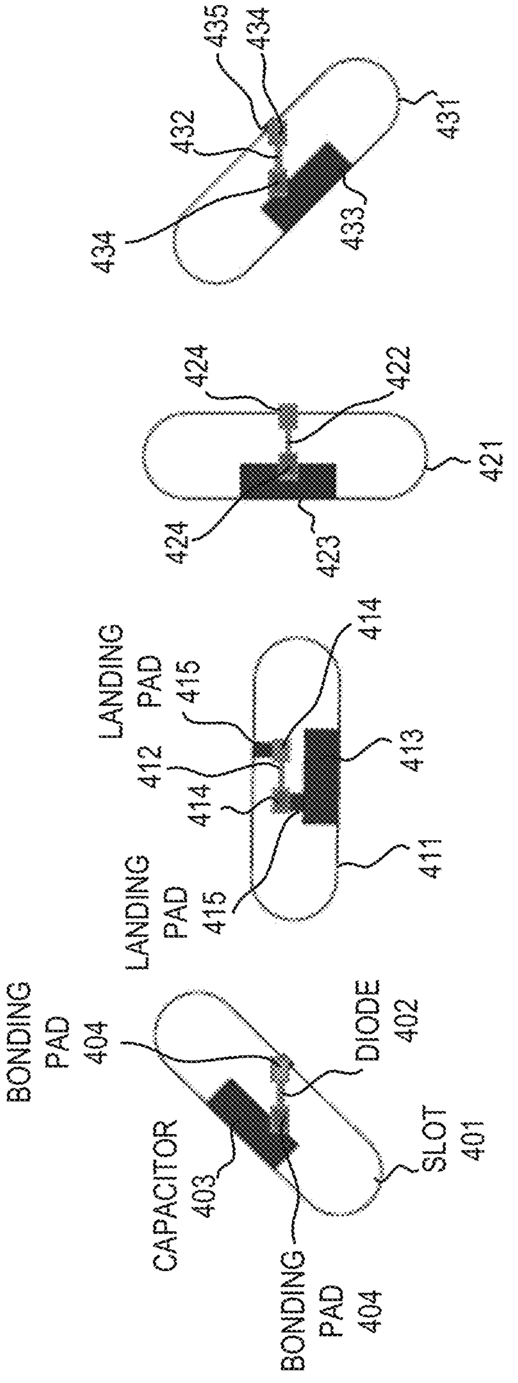
FIG. 4A illustrates examples of four antenna elements with slots and horizontally-oriented diodes.

FIG. 4A illustrates examples of four antenna elements with slots and horizontally-oriented diodes. FIG. 4A illustrates examples of antenna elements with slots in horizontally oriented diodes. Referring to FIG. 4A, slot 401 includes diode 402 in a horizontal orientation. Diode 402 is coupled in series with capacitor 403 to create a series connection across slot 401 via bonding pads 404. More specifically, diode 402 is coupled to one slot via its bonding pad 404 and to capacitor 403 via bonding pad 404. Each of bonding pads 404 is coupled to a landing pad (not shown).

Slot 411 includes diode 412 in a horizontal orientation. Diode 412 is coupled in series with capacitor 413 across slot 411 via bonding pads 414. More specifically, diode 412 is coupled to one slot via its bonding pad 414 and to capacitor 413 via bonding pad 414. Each of bonding pads 414 is coupled to one of landing pads 415

Slot 421 includes diode 422 in a horizontal orientation. Diode 422 is coupled in series with capacitor 423 to create a series connection across slot 421 via bonding pads 424. More specifically, diode 422 is coupled to one slot via its bonding pad 424 and to capacitor 423 via bonding pad 424. Each of bonding pads 424 is coupled to a landing pad (not shown).

Slot 431 includes diode 432 in a horizontal orientation. Diode 432 is coupled in series with capacitor 433 to create a series connection across slot 431 via bonding pads 434. More specifically, diode 432 is coupled to one slot via its bonding pad 434 and to capacitor 433 via bonding pad 434. Each of bonding pads 434 is coupled to a landing pad, such as landing pad 435 (the other landing pad is not shown).

Figure 4B:
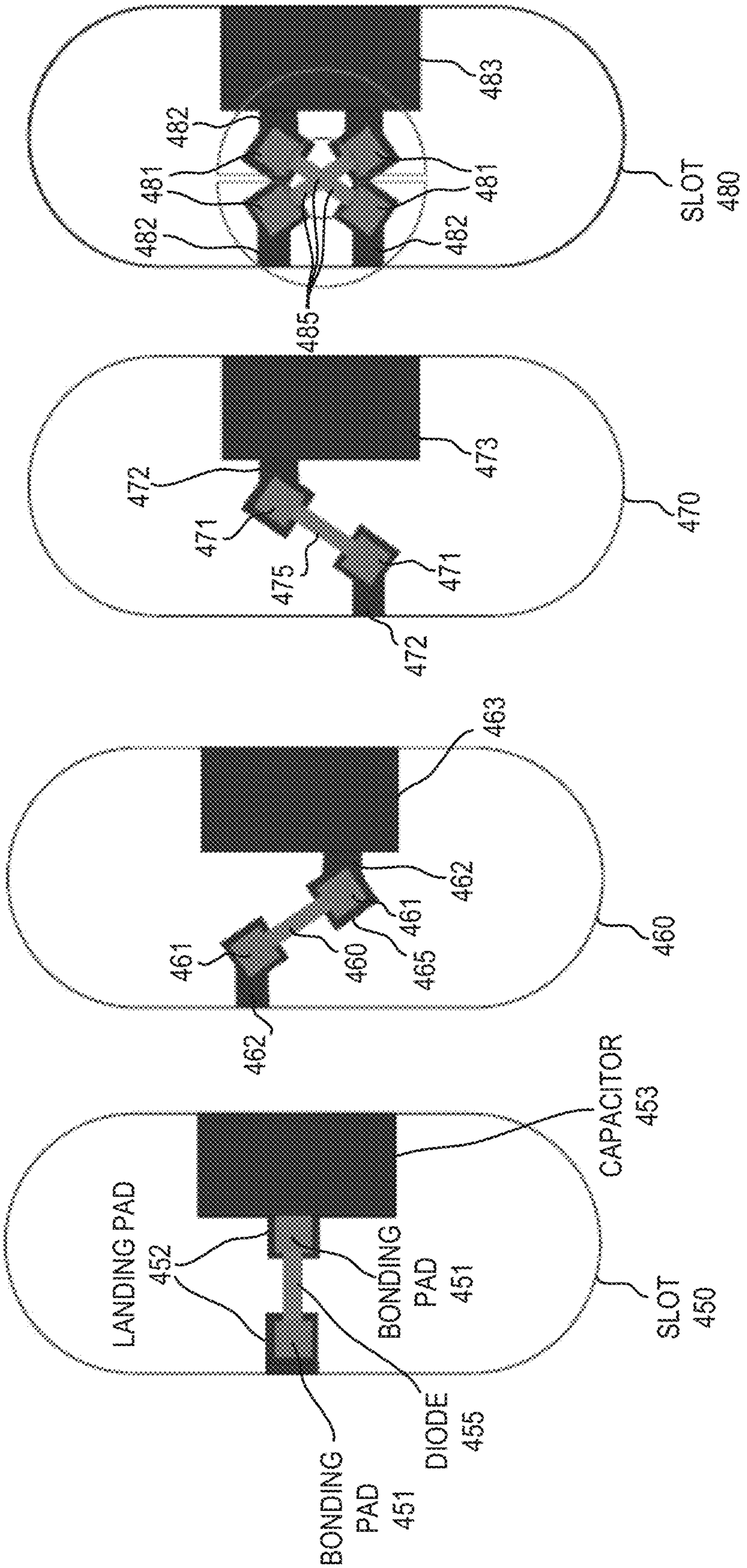
FIGS. 4B-4C illustrate examples of other antenna elements with vertical slots and having diodes of different orientations.
Figure 4C:
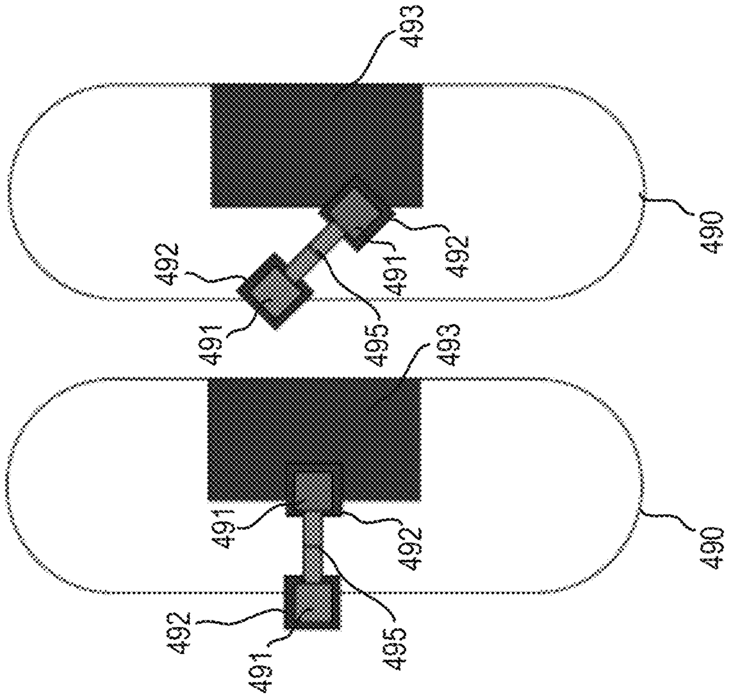

FIGS. 4B-4C illustrate examples of other antenna elements with vertical slots and having diodes of different orientations. Referring to FIG. 4B, slot 450 includes diode 455 coupled in series with capacitor 453 to create a series of connection across slot 450. Diode 455 is coupled to one side of slot 450 via a bonding pad 451 that is coupled to a landing pad 452 coupled to the side of slot 450. The other end of diode 455 is coupled via bonding pad 451 and landing pad 452 to capacitor 453. Capacitor 453 is coupled to the other side of slot 450. Note that the bonding pads and landing pads are both rectangular in shape in FIG. 4B. The bonding pads and/or the landing pads may be other shapes (e.g., circular) as long as they are capable of providing an electrical connection between the diode and the side of a slot and the capacitor 453.

Slot 460 includes diode 465 coupled in series with capacitor 463 to create a series connection across slot 460. Diode 465 is coupled to one side of slot 460 via a bonding pad 461 that is coupled to landing pad 462 which is coupled to the side of slot 460. The other end of diode 465 is coupled via bonding pad 461 and landing pad 462 to capacitor 463. Capacitor 463 is coupled to the other side of slot 460. Note that the bonding pads and landing pads are both rectangular in shape in FIG. 4B. The bonding pads and/or the landing pads may be other shapes (e.g., circular) as long as they are capable of providing an electrical connection between the diode and the side of a slot and the capacitor 463.

Slot 470 includes diode 475 coupled in series with capacitor 473 to create a series of connections across slot 470. Diode 475 is coupled to one side of slot 470 via a bonding pad 471 that is coupled to a landing pad 472, which is coupled to the side of slot 470. The other end of diode 475 is coupled via bonding pad 471 and landing pad 472 to capacitor 473. Capacitor 473 is coupled to the other side of slot 470. Note that the bonding pads and landing pads are both rectangular in shape in FIG. 4B. The bonding pads and/or the landing pads may be other shapes (e.g., circular) as long as they are capable of providing an electrical connection between the diode and the side of a slot and the capacitor 473.

Slot 480 includes diode 485 coupled in series with capacitor 483 to create a series of connections across slot 480. Diode 485 is coupled to one side of slot 480 via a bonding pad 481 that is coupled to a landing pad 482, which is coupled to the side of slot 480. The other end of diode 485 is coupled via bonding pad 481 and landing pad 482 to capacitor 483. Capacitor 483 is coupled to the other side of slot 480. Note that the bonding pads and landing pads are both rectangular in shape in FIG. 4B. The bonding pads and/or the landing pads may be other shapes (e.g., circular) as long as they are capable of providing an electrical connection between the diode and the side of a slot and the capacitor 483.

FIG. 4C illustrates two more examples of antenna elements with vertical slots. In this case, the landing pads to which the bonding pads of the diode are coupled are at the edges of the slot and do not fully extend into the slot itself. Similarly, the landing pads to which the bonding pad at the other end of the diode are coupled are partially over a portion of the capacitor as opposed to just attaching to a landing pad that extends from the capacitor.

Referring to FIG. 4C, in both examples, slot 490 includes diode 495 coupled in series with capacitor 493 to create a series of connections across slot 490. Diode 495 is coupled to one side of slot 490 via a bonding pad 491 that is coupled to a landing pad 492, which is coupled to the side of slot 490. The other end of diode 495 is coupled via bonding pad 491 and landing pad 492 to and on top of a portion of capacitor 493. Capacitor 493 is coupled to the other side of slot 490. Note that the bonding pads and landing pads are both rectangular in shape in FIG. 4B. The bonding pads and/or the landing pads may be other shapes (e.g., circular) as long as they are capable of providing an electrical connection between the diode and the side of a slot and the capacitor 493.

Figures 5A, 5B, 5C:
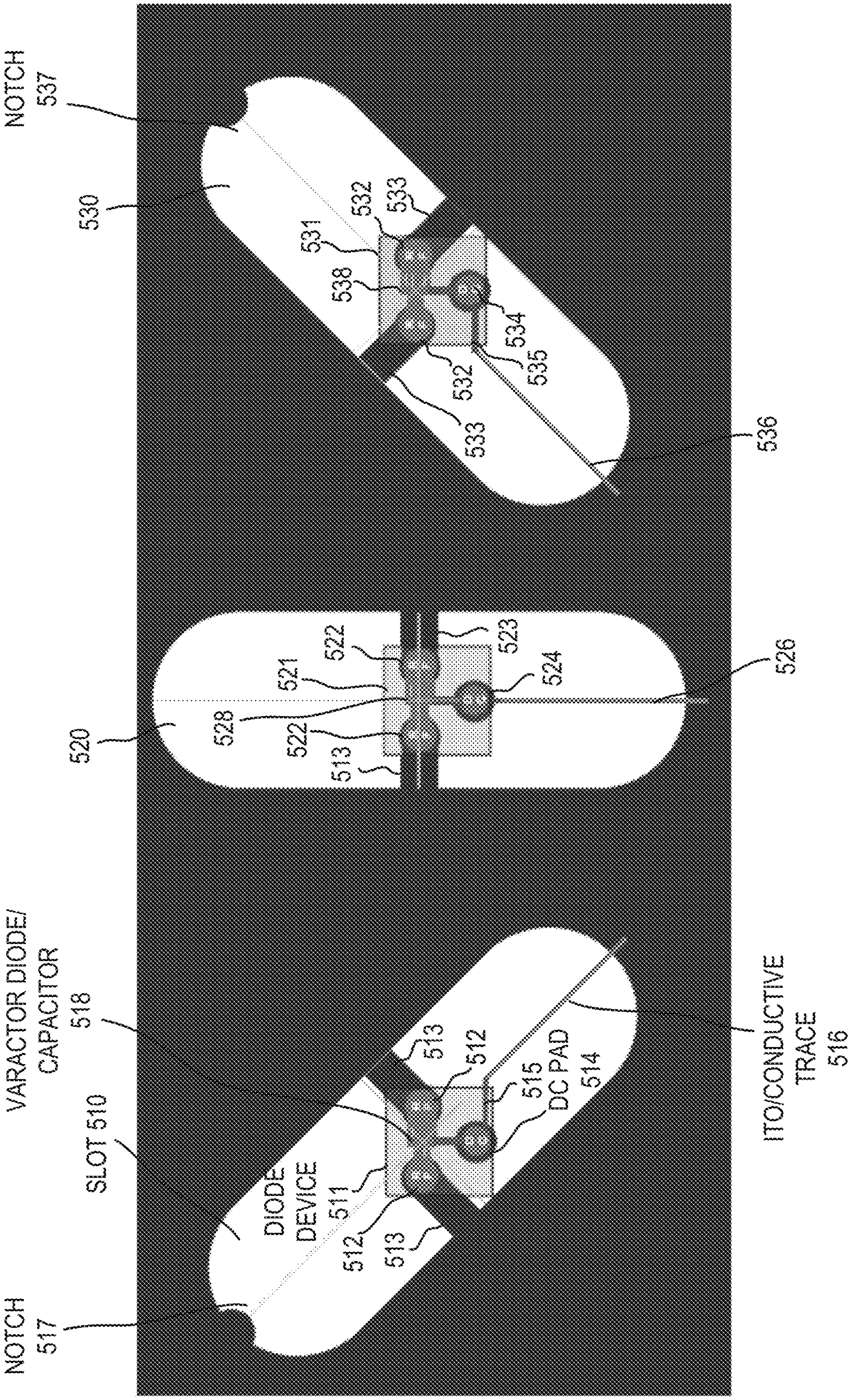
FIGS. 5A-5C illustrate embodiments of three cell designs with a uniform diode orientation.

FIGS. 5A-5C illustrate embodiments of three cell designs with a uniform diode orientation. In these example embodiments, each of the diode devices include a diode in the horizontal orientation while the slots have different rotations with respect to each other. Furthermore, in some embodiments, each of the diode devices has an axis of symmetry in the middle of the slot.

Referring to FIG. 5A, slot 510 includes diode device 511 that contains a diode in series with a capacitor 518. Bonding pads 512 are coupled to landing pads 513 that extend into slot 510. Bonding pads 512 in cooperation with landing pad 513 form RF terminals of slot 510. Diode device 511 also includes a direct current (DC) pad 514 coupled to the junction between the diode and the capacitor of diode/capacitor 518. DC pad 514 has an extension 515 of a DC trace. Extension 515 of the DC trace changes for every cell as its rotation changes. The extension 515 of the DC trace is coupled to the ITO/conductive trace 516. In some embodiments, trace 516 couples a tuning voltage to the diode of the diode/series capacitor 518.

Referring to FIG. 5B, slot 520 includes diode device 521 that contains a diode in series with a capacitor 528. Bonding pads 522 are coupled to landing pads 523 that extend into slot 520. Bonding pads 522 in cooperation with landing pad 523 form RF terminals of slot 520. Diode device 521 also includes a direct current (DC) pad 524 coupled to the junction between the diode and the capacitor of diode/capacitor 528. DC pad 524 is coupled to the ITO/conductive trace 526. In some embodiments, trace 526 couples a tuning voltage to the diode of the diode/series capacitor 528.

Referring to FIG. 5C, slot 530 includes diode device 531 that contains a diode in series with a capacitor 538. Bonding pads 532 are coupled to landing pads 533 that extend into slot 530. Bonding pads 532 in cooperation with landing pad 533 form RF terminals of slot 530. Diode device 531 also includes a direct current (DC) pad 534 coupled to the junction between the diode and the capacitor of diode/ capacitor 538. DC pad 534 has an extension 535 of a DC trace. Extension 535 of the DC trace changes for every cell as its rotation changes. The extension 535 of the DC trace is coupled to the ITO/conductive trace 536. In some embodiments, trace 536 couples a tuning voltage to the diode of the diode/series capacitor 538.

Slot 510 of FIG. 5A and Slot 530 of FIG. 5C include notches. For example, slot 510 includes notch 517, while slot 530 includes notch 537. As is described in more detail below, notches 517 and 537 change the perimeter length around slots 510 and 530, respectively, which changes the resonance frequency of the antenna element. Other features may be included in slot instead of, or in addition to, these notches. Examples of these features are described in further detail below.

Figures 6A, 6B, 6C:
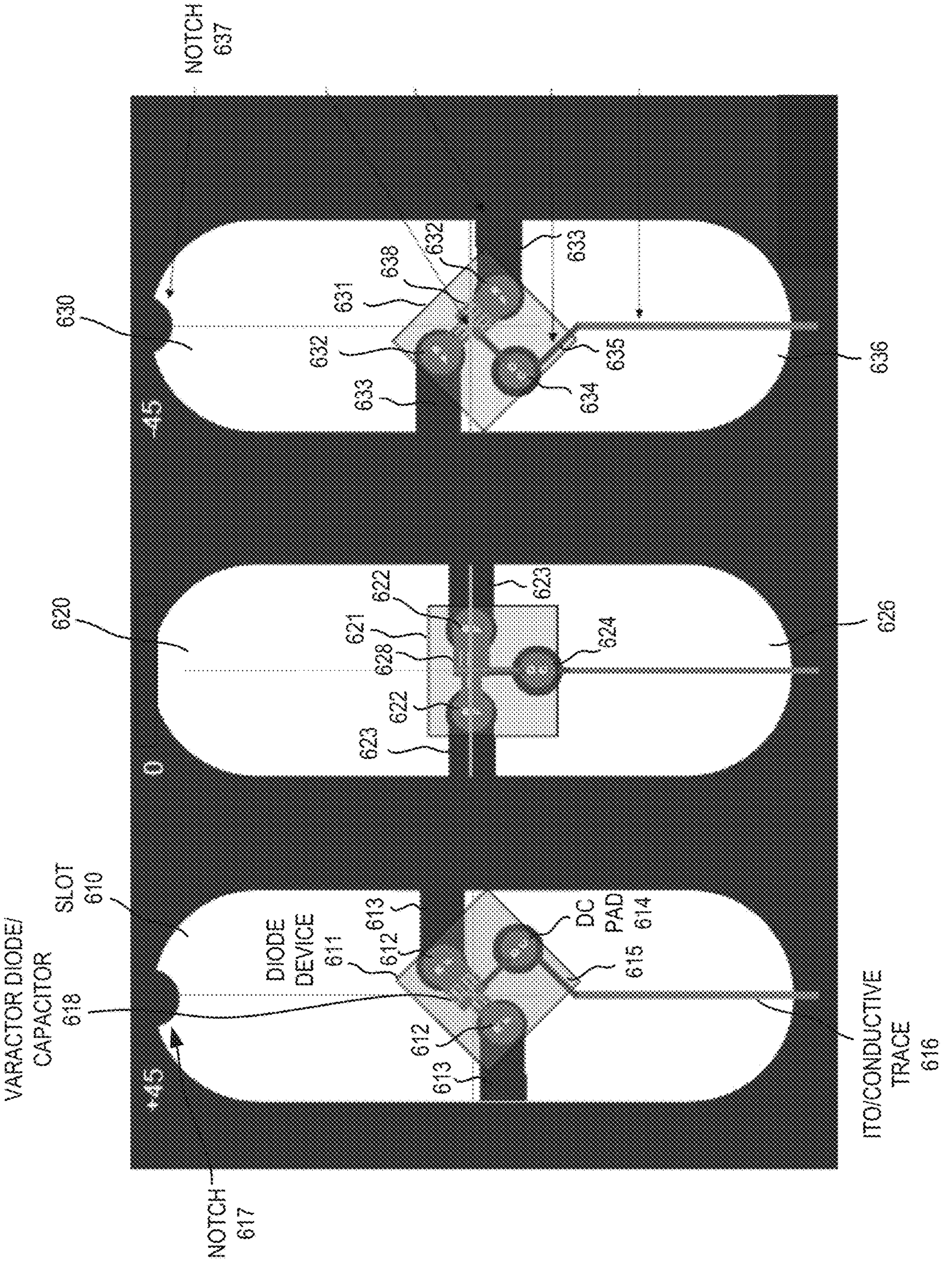
FIGS. 6A-6C illustrate embodiments of three cell designs with a uniform diode orientation in which each of the diode devices include a diode in the horizontal orientation.

FIGS. 6A-6C illustrate embodiments of three cell designs with a uniform diode orientation in which each of the diode devices includes a diode in the horizontal orientation (while the slots have different rotations with respect to each other). Furthermore, in some embodiments, each of the diode devices has an axis of symmetry in the middle of the slot.

Referring to FIG. 6A, slot 610 includes diode device 611 that contains a diode in series with a capacitor 618. Bonding pads 612 are coupled to landing pads 613 that extend into slot 610. Bonding pads 612 in cooperation with landing pad 613 form RF terminals of slot 610. Diode device 611 also includes a direct current (DC) pad 614 coupled to the junction between the diode and the capacitor of diode/capacitor 618. DC pad 614 has an extension 615 of a DC trace. Extension 615 of the DC trace changes for every cell as its rotation changes. The extension 615 of the DC trace is coupled to the ITO/conductive trace 616. In some embodiments, trace 616 couples a tuning voltage to the diode of the diode/series capacitor 618.

Referring to FIG. 6B, slot 620 includes diode device 621 that contains a diode in series with a capacitor 628. Bonding pads 622 are coupled to landing pads 623 that extend into slot 620. Bonding pads 622 in cooperation with landing pad 623 form RF terminals of slot 620. Diode device 621 also includes a direct current (DC) pad 624 coupled to the junction between the diode and the capacitor of diode/capacitor 628. DC pad 624 is coupled to the ITO/conductive trace 626. In some embodiments, trace 626 couples a tuning voltage to the diode of the diode/series capacitor 628.

Referring to FIG. 6C, slot 630 includes diode device 631 that contains a diode in series with a capacitor 638. Bonding pads 632 are coupled to landing pads 633 that extend into slot 630. Bonding pads 632 in cooperation with landing pad 633 form RF terminals of slot 630. Diode device 631 also includes a direct current (DC) pad 634 coupled to the junction between the diode and the capacitor of diode/capacitor 638. DC pad 634 has an extension 635 of a DC trace. Extension 635 of the DC trace changes for every cell as its rotation changes. The extension 635 of the DC trace is coupled to the ITO/conductive trace 636. In some embodiments, trace 636 couples a tuning voltage to the diode of the diode/series capacitor 638.

Slot 610 of FIG. 6A and Slot 630 of FIG. 6C include notches 617 and 637 respectively. As is described in more detail below, these notches change the perimeter length around slots 610 and 630, respectively, which changes the resonance frequency of the antenna element. Other features may be included in slot instead of, or in addition to, these notches. Examples of these features are described in further detail below.

In some embodiments, as discussed above, the diodes of FIGS. 2A-6C are replaced with other types of solid state devices.

Frequency Compensation

FIGS. 7A through 7F illustrate different ways to tune the resonance frequency of each cell depending on its rotation. One or more of the following features may be included in a slot to change its perimeter length. By changing the perimeter length of the slot, the resonance frequency of each cell may be changed. In some embodiments, changing the perimeter length of a slot by 1 mil changes the resonance frequency of the antenna element by 100 MHz. In other words, increasing the perimeter length of a slot by 1 mil causes the resonance frequency of the slot to be reduced by 100 MHz, while decreasing the perimeter length of a slot by 1 mil causes the resonance frequency of the slot to be increased by 100 MHz. By being able to adjust the resonance frequency of a slot, all of the slots of an antenna aperture, or portion thereof (e.g., antenna aperture segment, etc.), can be set to particular resonance frequencies (e.g., all antenna elements set to the same resonance frequency, etc.).

In some embodiments, a variety of features can be incorporated in a slot to adjust its perimeter length. Such features can be included on one or both sides or top and/or bottom of a slot. In some embodiments, every slot can have an individually customized feature or size. In some other embodiments, slots can also be binned into sub-groups (e.g., segments, sub-segments, etc.) to lower the variation when the antenna aperture is being manufactured.

In some embodiments, the slot dimensions can be changed directly without adding new features. For example, individual slots can be lengthened or shortened to change the resonance frequency. That is, longer or shorter slots may be used with different perimeter lengths in order to control the resonance frequencies of the antenna elements.

In some embodiments, each diode can have two or more connection pads, which impacts iris loading and thereby affects resonance frequency. In some embodiments, antenna elements can be loaded with different external features such as, for example, dipoles or patches, to tune the resonance of each unit cell depending on its rotation.

In some embodiments, a diode can have two or more connection pads as shown in FIGS. 7A-7E. Each diode has two RF pads (operating as RF terminals when the antenna element is receiving signals) and a DC pad for a receiving a tuning (bias) voltage and providing it to the diode.

Figure 7A:
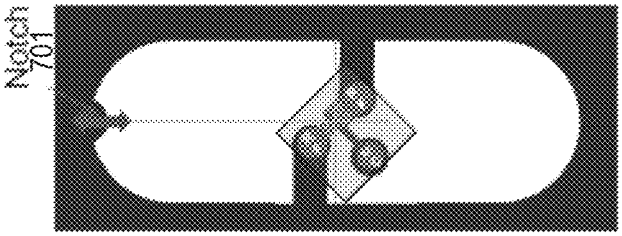
FIGS. 7A-7F illustrate different ways to tune the resonance frequency of each cell depending on its rotation.
Figure 7B:
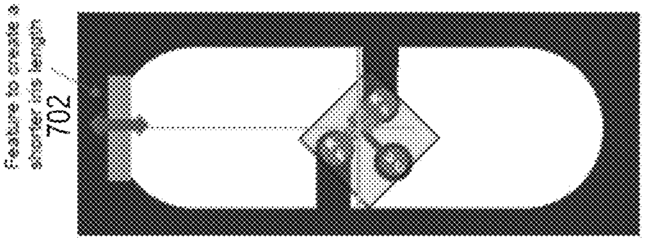
Figure 7C:
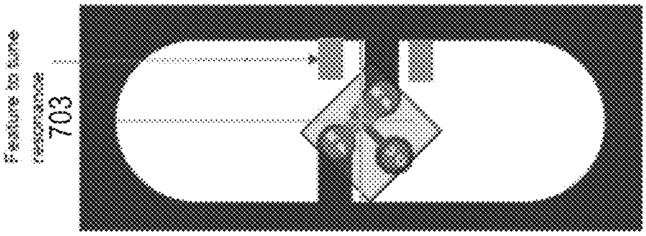
Figure 7D:
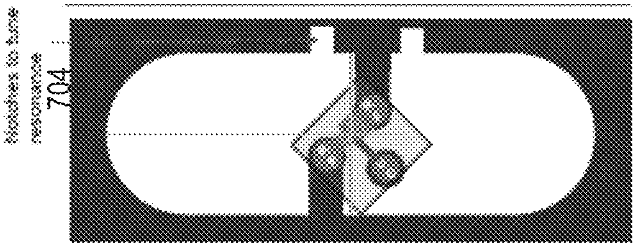
Figure 7E:
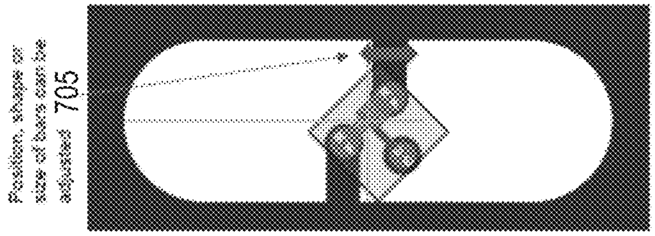
Figure 7F:
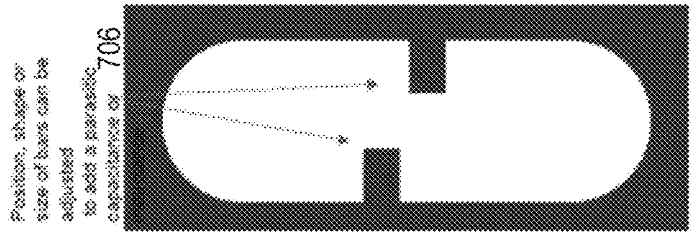

FIG. 7A illustrates the including of a notch 701 at the end of a slot (e.g., the top of a slot, the bottom of a slot, etc.). FIG. 7B illustrates rectangular-like feature 702 at one end of a slot (e.g., the top of a slot, the bottom of a slot) to create a shorter slot length. FIG. 7C illustrates feature 703 that includes one or more protrusions into the slot to change the slot dimensions. FIG. 7D illustrates two notches that extend away from the edge of the slot to change the length of the perimeter of the slot to tune its resonance. FIG. 7E illustrates that the position, shape, or size of the landing pad 705 may be adjusted to adjust the length of the perimeter of the slot to tune the resonance frequency of the cell. FIG. 7F illustrates the position, shape and size of bar 706 on both sides of the slot may be adjusted to add a parasitic capacitance or inductance in order to tune the resonance frequency of each cell depending on its rotation. Note that the bars are different from landing pads and can be used to compensate the frequency shift due to the different landing pad configurations. In some embodiments, the bars are specifically designed for each configuration of iris orientation to compensate for different sized landing pads. When the landing pads become longer or shorter (based on orientation of the iris), they might increase or decrease the overall inductance and/or capacitance of the iris, resulting in a frequency shift. To compensate that frequency shift, an additional loading element (such as the bar) is designed and added to the iris. The features described in conjunction with FIGS. 7A-7F can be various sizes and dimensions to cause the desired change in resonance frequency (e.g., 1 mil change in perimeter length causing a 100 MHz change in resonance frequency, etc.).

Thus, a frequency shift can be made for every unit cell to compensate for the slight change in orientation every cell has with respect to an adjacent cells in the row (e.g., ring). by performing modifications in the size of a slot.

In some embodiments, the tuning of the resonance frequency of individual antenna is made under software control. This may be done in cooperation with the hardware features added to adjust the resonance frequency of individual slots or in lieu of those hardware features. Examples of such software control to cause a frequency adjustment of every cell include controlling the varactor diode to account for the offset frequency. In some embodiments, controlling the varactor diode to account for the offset frequency can be performed by mapping the offset frequency to a voltage offset or modifying the DAC value to incorporate the required voltage offset and applying that offset or the new DAC to the RF element to align the resonance frequencies of all elements. In some embodiments, the DAC values are values supported by an FPGA pattern driver that produces the desired voltage output to the RF elements.

In some embodiments, controlling the varactor diode to account for the offset frequency comprises calculating the resonator model of every slot separately and having each of these models take the actual resonances of that particular unit slot into account. Once the amount of frequency shift for each orientation of an iris is known, the voltage for the diode may be modified in order to compensate for the frequency shift.

Note that adjusting the resonance frequencies of antenna elements may be performed with design and/or manufacturing an antenna aperture, or portion thereof (e.g., an antenna aperture segment, etc.). In some embodiments, the diodes of FIG. 7 are replaced with other types of solid state devices.

Figure 8:
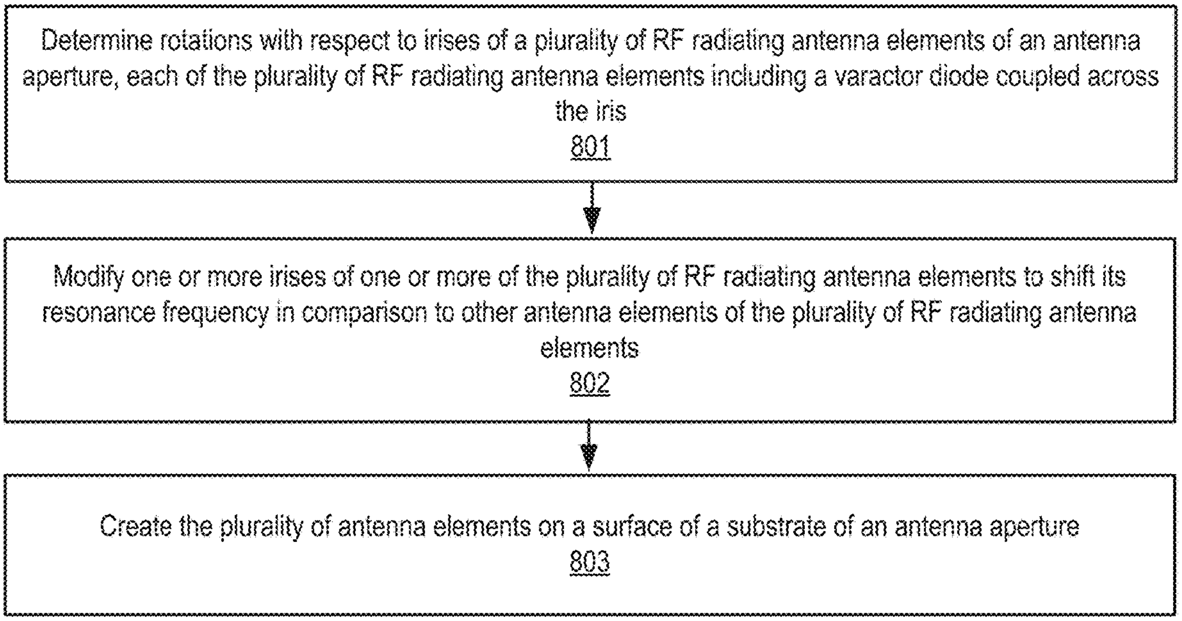
FIG. 8 is a flow diagram of some embodiments of a process for manufacturing an antenna aperture.

FIG. 8 is a flow diagram of some embodiments of a process for manufacturing an antenna aperture. The process is performed by processing logic that comprises hardware (e.g., circuitry, dedicated logic, etc.), software (e.g., software running on a chip(s) or processor(s), etc.), firmware, or a combination of the three.

Referring to FIG. 8, the process includes processing logic determining rotations with respect to slots/irises of radiating antenna elements of an antenna aperture (801). In some embodiment, this determination occurs when determining the layout of antenna elements of the antenna aperture. In some embodiments, each of the RF radiating antenna elements includes a varactor diode coupled across the slot. The diode can be coupled to a capacitor (e.g., a tunable capacitor, an IDC, etc.) coupled in series with the diode.

After determining the rotations, processing logic modifies one or more slots/irises of RF radiating antenna elements to shift its resonance frequency in comparison to other antenna elements of the plurality of RF radiating antenna elements (802). In some embodiments, modifying one or more slots of the RF radiating antenna elements comprises modifying perimeter length of the irises of the one or more antenna elements different than perimeter length of the irises of the other antenna elements. In some embodiments, modifying one or more slots of the RF radiating antenna elements comprises compensating for changes in orientation of irises with respect to adjacently positioned irises in a same ring.

After modifying the slots/irises of the aperture design, processing logic creates the plurality of antenna elements on a surface of a substrate (e.g., a metasurface) of an antenna aperture (803). Such manufacturing techniques are well-known in the art.

In some embodiments, the diodes of FIG. 8 are replaced with other types of solid state devices.

Examples of Antenna Details

The techniques described above may be used with flat panel satellite antennas. Embodiments of such flat panel antennas are disclosed. The flat panel antennas include one or more arrays of antenna elements on an antenna aperture. These antennas include a control structure to control the operations of the antenna including the antenna elements in the antenna aperture.

In one embodiment, the control structure for the antenna system has two main components: the antenna array controller, which includes drive electronics for the antenna system, is below the wave scattering structure of surface scattering antenna elements such as described herein, while the matrix drive switching array is interspersed throughout the radiating RF array in such a way as to not interfere with the radiation. In one embodiment, the drive electronics for the antenna system comprise commercial off-the shelf LCD controls used in commercial television appliances that adjust the bias voltage for each scattering element by adjusting the amplitude or duty cycle of an AC bias signal to that element.

In one embodiment, the antenna array controller also contains a microprocessor executing the software. The control structure may also incorporate sensors (e.g., a GPS receiver, a three-axis compass, a 3-axis accelerometer, 3-axis gyro, 3-axis magnetometer, etc.) to provide location and orientation information to the processor. The location and orientation information may be provided to the processor by other systems in the earth station and/or may not be part of the antenna system.

More specifically, the antenna array controller controls which elements are turned off and those elements turned on and at which phase and amplitude level at the frequency of operation. The elements are selectively detuned for frequency operation by voltage application. In one embodiment, a matrix drive is used to apply voltage to the varactor diode in order to drive each cell separately from all the other cells without having a separate connection for each cell (direct drive). Because of the high density of elements, the matrix drive is an efficient way to address each cell individually.

For transmission, a controller supplies an array of voltage signals to the RF diodes to create a modulation, or control pattern. The control pattern causes the elements to be turned to different states. In one embodiment, multistate control is used in which various elements are turned on and off to varying levels, further approximating a sinusoidal control pattern, as opposed to a square wave (i.e., a sinusoid gray shade modulation pattern). In one embodiment, some elements radiate more strongly than others, rather than some elements radiate and some do not. Variable radiation is achieved by applying specific voltage levels, which adjusts the liquid crystal permittivity to varying amounts, thereby detuning elements variably and causing some elements to radiate more than others.

The generation of a focused beam by the metamaterial array of elements can be explained by the phenomenon of constructive and destructive interference. Individual electromagnetic waves sum up (constructive interference) if they have the same phase when they meet in free space, and waves cancel each other (destructive interference) if they are in opposite phase when they meet in free space. If the slots in a slotted antenna are positioned so that each successive slot is positioned at a different distance from the excitation point of the guided wave, the scattered wave from that element will have a different phase than the scattered wave of the previous slot. If the slots are spaced one quarter of a guided wavelength apart, each slot will scatter a wave with a one fourth phase delay from the previous slot.

Using the array, the number of patterns of constructive and destructive interference that can be produced can be increased so that beams can be pointed theoretically in any direction plus or minus ninety degrees (90°) from the bore sight of the antenna array, using the principles of holography. Thus, by controlling which metamaterial unit cells are turned on or off (i.e., by changing the pattern of which cells are turned on and which cells are turned off), a different pattern of constructive and destructive interference can be produced, and the antenna can change the direction of the main beam. The time required to turn the unit cells on and off dictates the speed at which the beam can be switched from one location to another location.

In one embodiment, the antenna system produces one steerable beam for the uplink antenna and one steerable beam for the downlink antenna. In one embodiment, the antenna system uses metamaterial technology to receive beams and to decode signals from the satellite and to form transmit beams that are directed toward the satellite. In one embodiment, the antenna systems are analog systems, in contrast to antenna systems that employ digital signal processing to electrically form and steer beams (such as phased array antennas). In one embodiment, the antenna system is considered a "surface" antenna that is planar and relatively low profile, especially when compared to conventional satellite dish receivers.

Figure 9A:
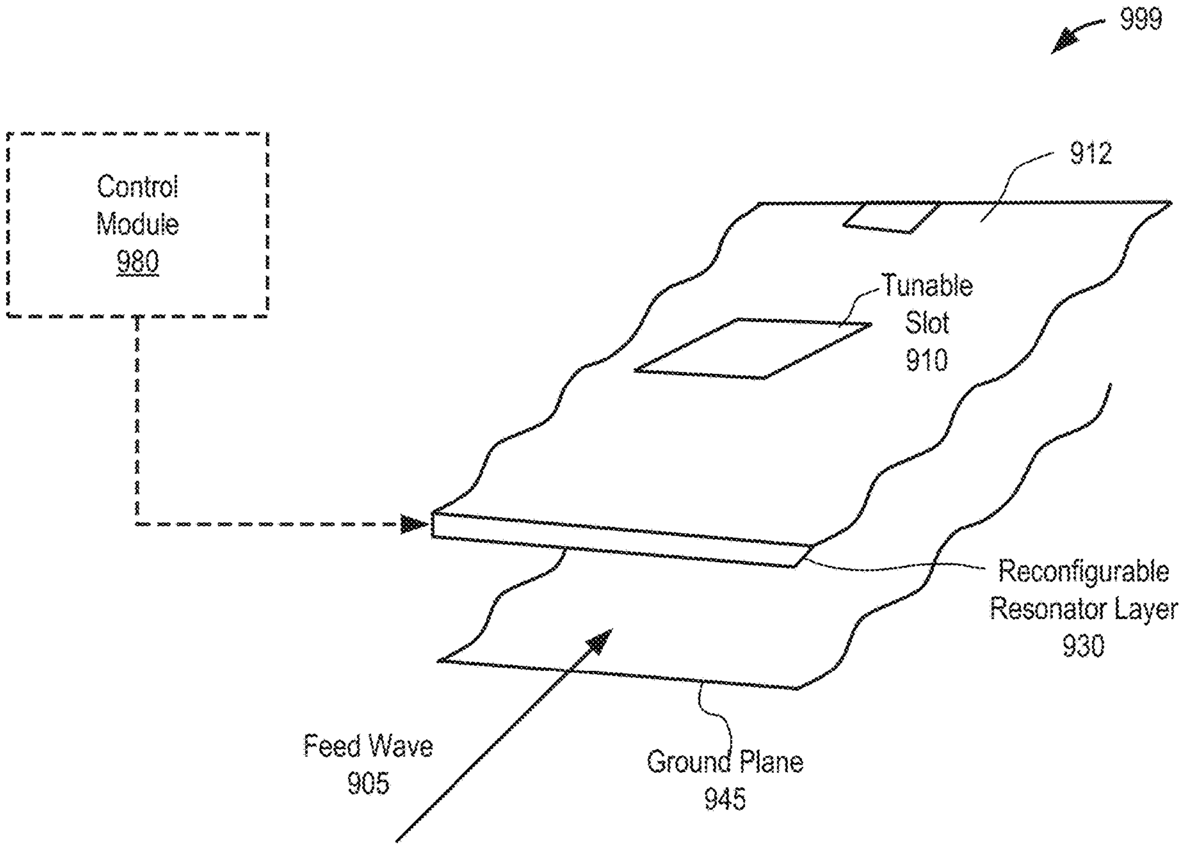
FIG. 9A illustrates a perspective view of one row of antenna elements that includes a ground plane and a reconfigurable resonator layer.

FIG. 9A illustrates a perspective view of one row of antenna elements that includes a ground plane 945 and a reconfigurable resonator layer 930. Reconfigurable resonator layer 930 includes an array 912 of tunable slots 910. The array 912 of tunable slots 910 can be configured to point the antenna in a desired direction. Each of the tunable slots 910 can be tuned/adjusted by varying a voltage, which changes the capacitance of the varactor diode and results in a frequency shift, which in turn changes the amplitude and phase of the radiating antenna element. A proper phase and amplitude adjustment of the antenna elements in an array will result in a beam formation and beam steering.

Control module 980, or a controller, is coupled to reconfigurable resonator layer 930 to modulate the array 912 of tunable slots 910 by varying the voltage to the diodes/varactors. Control module 980 may include a Field Programmable Gate Array ("FPGA"), a microprocessor, a controller, System-on-a-Chip (SoC), or other processing logic. In one embodiment, control module 980 includes logic circuitry (e.g., multiplexer) to drive the array 912 of tunable slots 910. In one embodiment, control module 980 receives data that includes specifications for a holographic diffraction pattern to be driven onto the array 912 of tunable slots 910. The holographic diffraction patterns may be generated in response to a spatial relationship between the antenna and a satellite so that the holographic diffraction pattern steers the downlink beams (and uplink beam if the antenna system performs transmit) in the appropriate direction for communication. Although not drawn in each figure, a control module similar to control module 980 may drive each array of tunable slots described in various embodiments in the disclosure.

Radio Frequency ("RF") holography is also possible using analogous techniques where a desired RF beam can be generated when an RF reference beam encounters an RF holographic diffraction pattern. In the case of satellite communications, the reference beam is in the form of a feed wave, such as feed wave 905 (approximately 20 GHz in some embodiments). To transform a feed wave into a radiated beam (either for transmitting or receiving purposes), an interference pattern is calculated between the desired RF beam (the object beam) and the feed wave (the reference beam). The interference pattern is driven onto the array of tunable slots 910 as a diffraction pattern so that the feed wave is "steered" into the desired RF beam (having the desired shape and direction). In other words, the feed wave encountering the holographic diffraction pattern "reconstructs" the object beam, which is formed according to design requirements of the communication system. The holographic diffraction pattern contains the excitation of each element and is calculated by $w_{hologram}=w^*_{in}w_{out}$, with $w_{in}$ as the wave equation in the waveguide and $w_{out}$ the wave equation on the outgoing wave.

A voltage between the varactor diode and the iris opening can be modulated to tune the antenna element (e.g., the tunable resonator/slot). Adjusting the voltage varies the capacitance of a slot (e.g., the tunable resonator/slot). Accordingly, the reactance of a slot (e.g., the tunable resonator/slot) can be varied by changing the capacitance. Resonant frequency of the slot also changes according to the equation $$f = \frac{1}{2\pi\sqrt{LC}}$$

where f is the resonant frequency of the slot and L and C are the inductance and capacitance of the slot, respectively. The resonant frequency of the slot affects the energy radiated from feed wave 905 propagating through the waveguide. As an example, if feed wave 905 is 20 GHz, the resonant frequency of a slot 910 may be adjusted (by varying the capacitance) to 17 GHz so that the slot 910 couples substantially no energy from feed wave 905. Or, the resonant frequency of a slot 910 may be adjusted to 20 GHz so that the slot 910 couples energy from feed wave 905 and radiates that energy into free space. Although the examples given are binary (fully radiating or not radiating at all), full gray scale control of the reactance, and therefore the resonant frequency of slot 910 is possible with voltage variance over a multi-valued range. Hence, the energy radiated from each slot 910 can be finely controlled so that detailed holographic diffraction patterns can be formed by the array of tunable slots.

In one embodiment, tunable slots in a row are spaced from each other by λ/5. Other spacings may be used. In one embodiment, each tunable slot in a row is spaced from the closest tunable slot in an adjacent row by λ/2, and, thus, commonly oriented tunable slots in different rows are spaced by λ/4, though other spacings are possible (e.g., λ/5, λ/6.3). In another embodiment, each tunable slot in a row is spaced from the closest tunable slot in an adjacent row by λ/3.

Figure 9B:
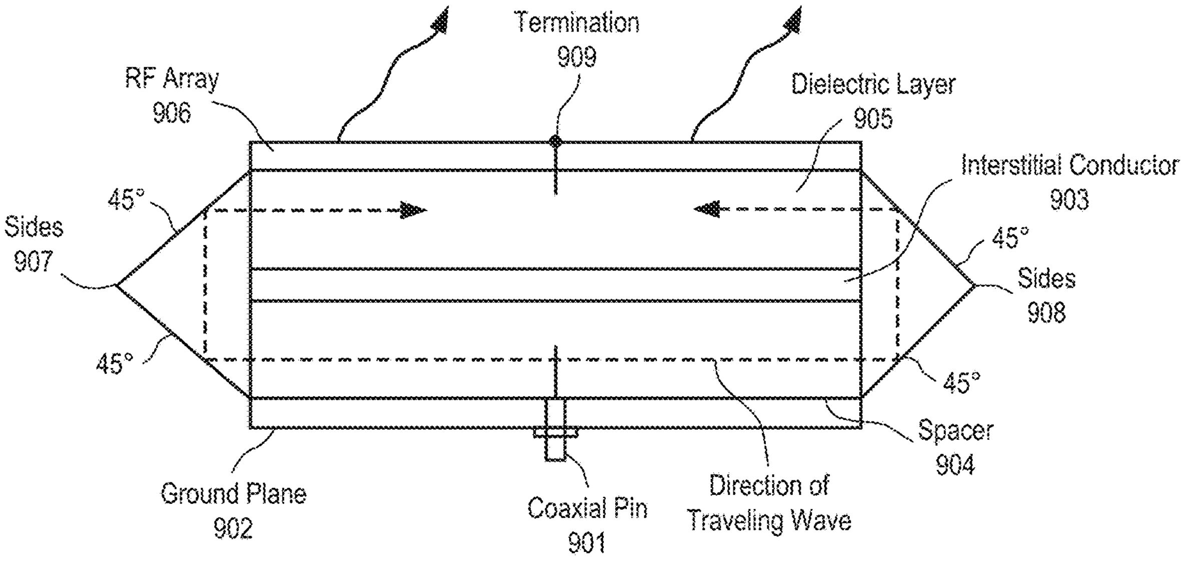
FIG. 9B illustrates a side view of one embodiment of a cylindrically fed antenna structure.

FIG. 9B illustrates a side view of one embodiment of a cylindrically fed antenna structure. The antenna produces an inwardly travelling wave using a double layer feed structure (i.e., two layers of a feed structure). In one embodiment, the antenna includes a circular outer shape, though this is not required. That is, non-circular inward travelling structures can be used. In one embodiment, the antenna structure in FIG. 9B includes a coaxial feed, such as, for example, described in U.S. Publication No. 2015/0236412, entitled "Dynamic Polarization and Coupling Control from a Steerable Cylindrically Fed Holographic Antenna", filed on Nov. 21, 2014.

Referring to FIG. 9B, a coaxial pin 901 is used to excite the field on the lower level of the antenna. In one embodiment, coaxial pin 901 is a 50Ω coax pin that is readily available. Coaxial pin 901 is coupled (e.g., bolted) to the bottom of the antenna structure, which is conducting ground plane 902.

Separate from conducting ground plane 902 is interstitial conductor 903, which is an internal conductor. In one embodiment, conducting ground plane 902 and interstitial conductor 903 are parallel to each other. In one embodiment, the distance between ground plane 902 and interstitial conductor 903 is 0.1-0.15". In another embodiment, this distance may be λ/2, where λ, is the wavelength of the travelling wave at the frequency of operation.

Ground plane 902 is separated from interstitial conductor 903 via a spacer 904. In one embodiment, spacer 904 is a foam or air-like spacer. In one embodiment, spacer 904 comprises a plastic spacer.

On top of interstitial conductor 903 is dielectric layer 905. In one embodiment, dielectric layer 905 is plastic. The purpose of dielectric layer 905 is to slow the travelling wave relative to free space velocity. In one embodiment, dielectric layer 905 slows the travelling wave by 30% relative to free space. In one embodiment, the range of indices of refraction that are suitable for beam forming are 1.2-1.8, where free space has by definition an index of refraction equal to 1. Other dielectric spacer materials, such as, for example, plastic, may be used to achieve this effect. Note that materials other than plastic may be used as long as they achieve the desired wave slowing effect. Alternatively, a material with distributed structures may be used as dielectric layer 905, such as periodic sub-wavelength metallic structures that can be machined or lithographically defined, for example.

An RF array 906 is on top of dielectric layer 905. In one embodiment, the distance between interstitial conductor 903 and RF array 906 is 0.1-0.15". In another embodiment, this distance may be $\lambda_{eff}/2$, where $\lambda_{eff}$ is the effective wavelength in the medium at the design frequency.

The antenna includes sides 907 and 908. Sides 907 and 908 are angled to cause a travelling wave feed from coax pin 901 to be propagated from the area below interstitial conductor 903 (the spacer layer) to the area above interstitial conductor 903 (the dielectric layer) via reflection. In one embodiment, the angle of sides 907 and 908 are at 45° angles. In an alternative embodiment, sides 907 and 908 could be replaced with a continuous radius to achieve the reflection. While FIG. 9B shows angled sides that have angle of 45 degrees, other angles that accomplish signal transmission from lower-level feed to upper-level feed may be used. That is, given that the effective wavelength in the lower feed will generally be different than in the upper feed, some deviation from the ideal 45° angles could be used to aid transmission from the lower to the upper feed level. For example, in another embodiment, the 45° angles are replaced with a single step. The steps on one end of the antenna go around the dielectric layer, interstitial the conductor, and the spacer layer. The same two steps are at the other ends of these layers.

In operation, when a feed wave is fed in from coaxial pin 901, the wave travels outward concentrically oriented from coaxial pin 901 in the area between ground plane 902 and interstitial conductor 903. The concentrically outgoing waves are reflected by sides 907 and 908 and travel inwardly in the area between interstitial conductor 903 and RF array 906. The reflection from the edge of the circular perimeter causes the wave to remain in phase (i.e., it is an in-phase reflection). The travelling wave is slowed by dielectric layer 905. At this point, the travelling wave starts interacting and exciting with elements in RF array 906 to obtain the desired scattering.

To terminate the travelling wave, a termination 909 is included in the antenna at the geometric center of the antenna. In one embodiment, termination 909 comprises a pin termination (e.g., a 50Ω pin). In another embodiment, termination 909 comprises an RF absorber that terminates unused energy to prevent reflections of that unused energy back through the feed structure of the antenna. These could be used at the top of RF array 906.

Figure 10:
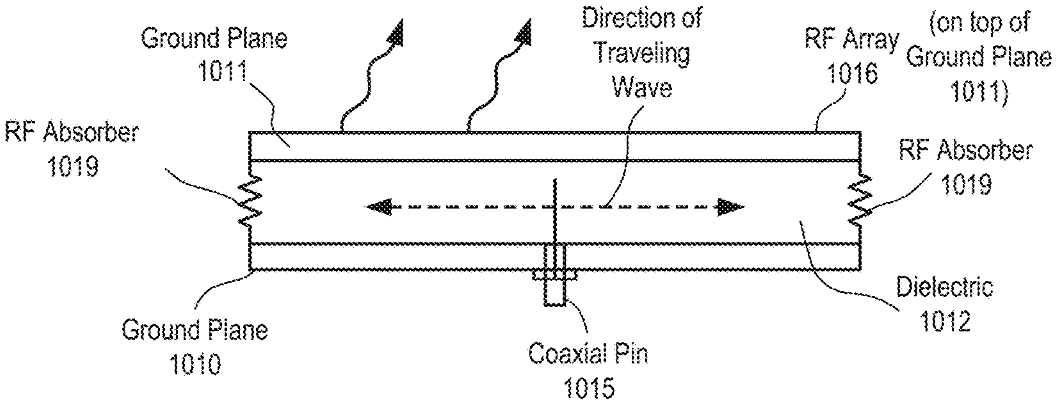
FIG. 10 illustrates another embodiment of the antenna system with an outgoing wave.

FIG. 10 illustrates another embodiment of the antenna system with an outgoing wave. Referring to FIG. 10, two ground planes 1010 and 1011 are substantially parallel to each other with a dielectric layer 1012 (e.g., a plastic layer, etc.) in between ground planes 1010, 1011. RF absorbers 1019 (e.g., resistors) couple the two ground planes 1010 and 1011 together. A coaxial pin 1015 (e.g., 50Ω) feeds the antenna. An RF array 1016 is on top of dielectric layer 1012 and ground plane 1011.

In operation, a feed wave is fed through coaxial pin 1015 and travels concentrically outward and interacts with the elements of RF array 1016.

The cylindrical feed in both the antennas of FIGS. 9B and 10 improves the service angle of the antenna. Instead of a service angle of plus or minus forty-five degrees azimuth (±45° Az) and plus or minus twenty-five degrees elevation (±25° El), in one embodiment, the antenna system has a service angle of seventy-five degrees (75°) from the bore sight in all directions. As with any beam forming antenna comprised of many individual radiators, the overall antenna gain is dependent on the gain of the constituent elements, which themselves are angle-dependent. When using common radiating elements, the overall antenna gain typically decreases as the beam is pointed further off bore sight. At 75 degrees off bore sight, significant gain degradation of about 6 dB is expected.

Embodiments of the antenna having a cylindrical feed solve one or more problems. These include dramatically simplifying the feed structure compared to antennas fed with a corporate divider network and therefore reducing total required antenna and antenna feed volume; decreasing sensitivity to manufacturing and control errors by maintaining high beam performance with coarser controls (extending all the way to simple binary control); giving a more advantageous side lobe pattern compared to rectilinear feeds because the cylindrically oriented feed waves result in spatially diverse side lobes in the far field; and allowing polarization to be dynamic, including allowing left-hand circular, right-hand circular, and linear polarizations, while not requiring a polarizer.

Array of Wave Scattering Elements

RF array 906 of FIG. 9B and RF array 1016 of FIG. 10 include a wave scattering subsystem that includes a group of antenna elements (e.g., scatterers) that act as radiators. This group of antenna elements comprises an array of scattering metamaterial elements.

In one embodiment, the cylindrical feed geometry of this antenna system allows the unit cells elements to be positioned at forty-five-degree (45°) angles to the vector of the wave in the wave feed. This position of the elements enables control of the polarization of the free space wave generated from or received by the elements. In one embodiment, the unit cells are arranged with an inter-element spacing that is less than a free-space wavelength of the operating frequency of the antenna. For example, if there are four scattering elements per wavelength, the elements in the 30 GHz transmit antenna will be approximately 2.5 mm (i.e., ¼ th the 10 mm free-space wavelength of 30 GHz).

Cell Placement

Figure 11:
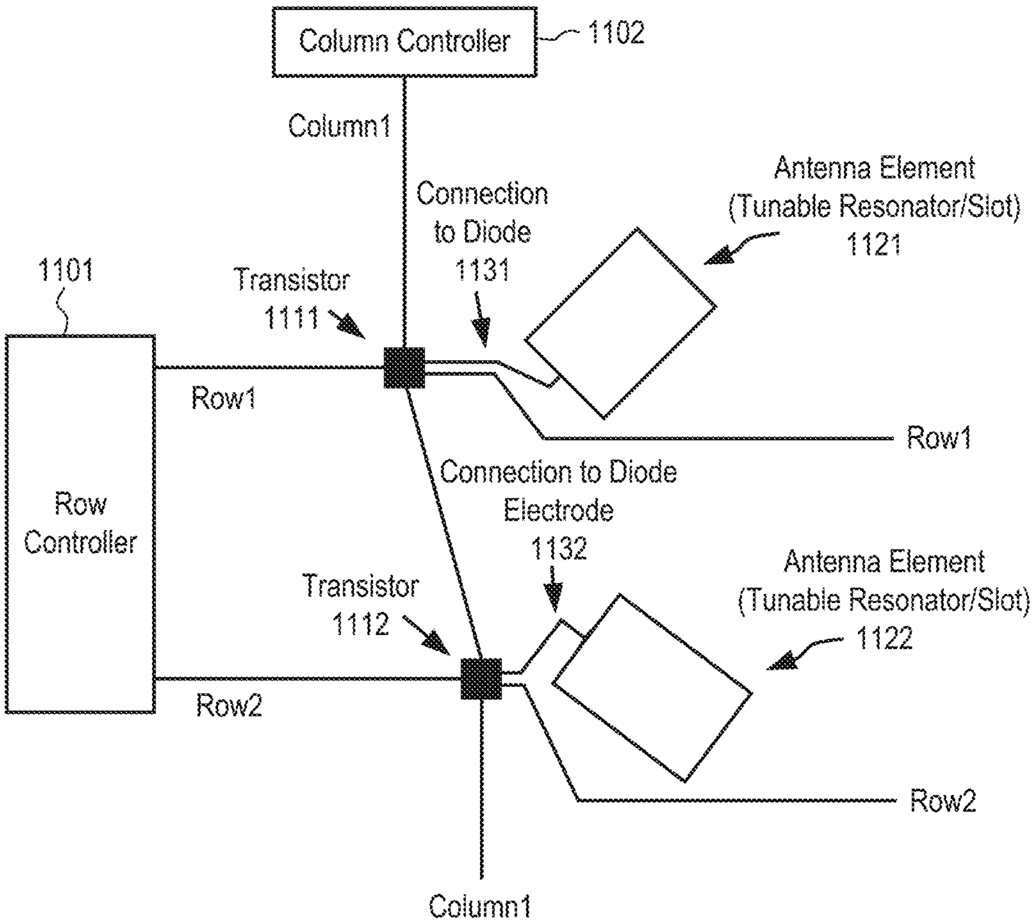
FIG. 11 illustrates one embodiment of the placement of matrix drive circuitry with respect to antenna elements.

In one embodiment, the antenna elements are placed on the cylindrical feed antenna aperture in a way that allows for a systematic matrix drive circuit. The placement of the cells includes placement of the transistors for the matrix drive. FIG. 11 illustrates one embodiment of the placement of matrix drive circuitry with respect to antenna elements. Referring to FIG. 11, row controller 1101 is coupled to transistors 1111 and 1112, via row select signals Row1 and Row2, respectively, and column controller 1102 is coupled to transistors 1111 and 1112 via column select signal Column1. Transistor 1111 is also coupled to antenna element 1121 via connection to diode 1131, while transistor 1112 is coupled to antenna element 1122 via connection to diode 1132.

In an initial approach to realize matrix drive circuitry on the cylindrical feed antenna with unit cells placed in a non-regular grid, two steps are performed. In the first step, the cells are placed on concentric rings and each of the cells is connected to a transistor that is placed beside the cell and acts as a switch to drive each cell separately. In the second step, the matrix drive circuitry is built in order to connect every transistor with a unique address as the matrix drive approach requires. Because the matrix drive circuit is built by row and column traces (similar to LCDs) but the cells are placed on rings, there is no systematic way to assign a unique address to each transistor. This mapping problem results in very complex circuitry to cover all the transistors and leads to a significant increase in the number of physical traces to accomplish the routing. Because of the high density of cells, those traces disturb the RF performance of the antenna due to coupling effect. Also, due to the complexity of traces and high packing density, the routing of the traces cannot be accomplished by commercially available layout tools.

In one embodiment, the matrix drive circuitry is predefined before the cells and transistors are placed. This ensures a minimum number of traces that are necessary to drive all the cells, each with a unique address. This strategy reduces the complexity of the drive circuitry and simplifies the routing, which subsequently improves the RF performance of the antenna.

More specifically, in one approach, in the first step, the cells are placed on a regular rectangular grid composed of rows and columns that describe the unique address of each cell. In the second step, the cells are grouped and transformed to concentric circles while maintaining their address and connection to the rows and columns as defined in the first step. A goal of this transformation is not only to put the cells on rings but also to keep the distance between cells and the distance between rings constant over the entire aperture. In order to accomplish this goal, there are several ways to group the cells.

Figure 12:
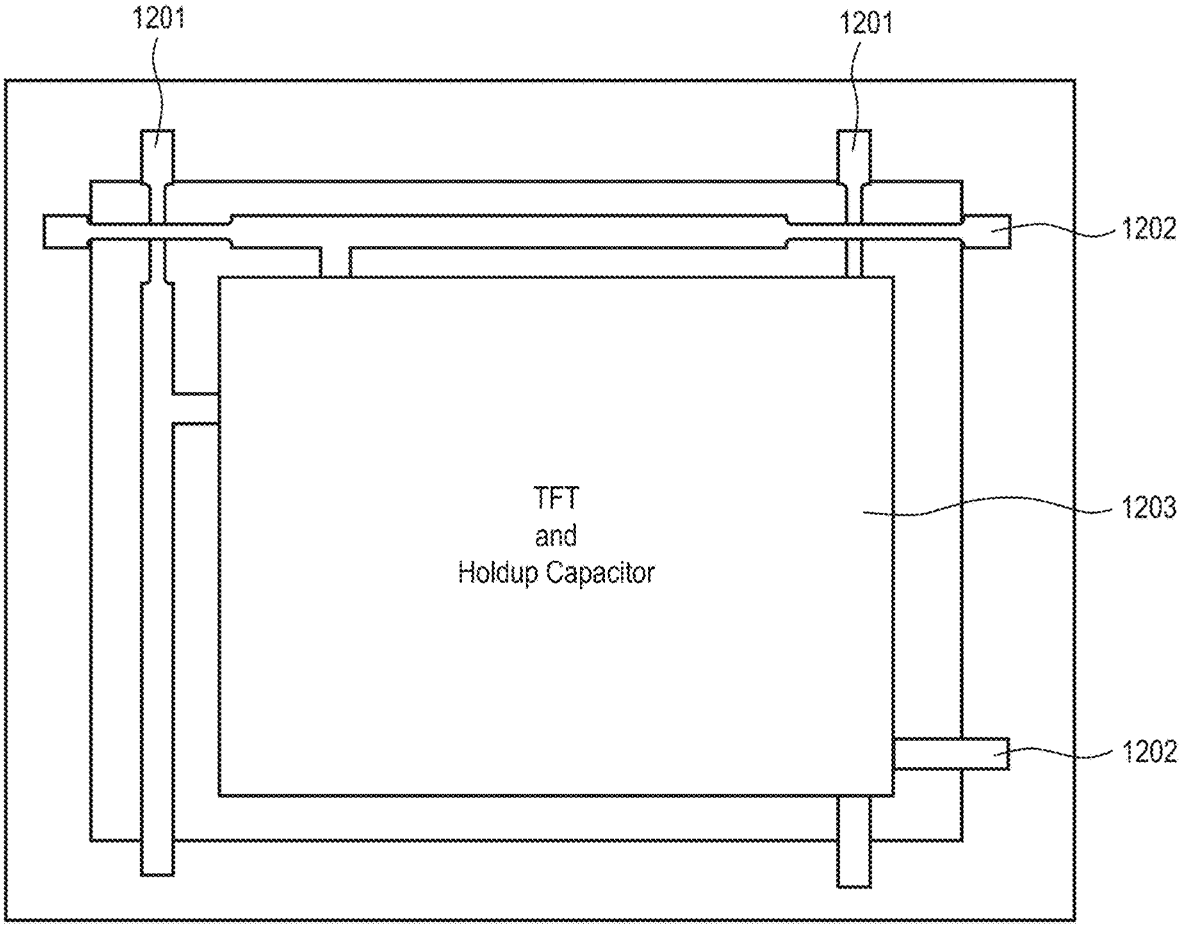
FIG. 12 illustrates one embodiment of a TFT package.

In one embodiment, a TFT package is used to enable placement and unique addressing in the matrix drive. FIG. 12 illustrates one embodiment of a TFT package. Referring to FIG. 12, a TFT and a hold capacitor 1203 is shown with input and output ports. There are two input ports connected to traces 1201 and two output ports connected to traces 1202 to connect the TFTs together using the rows and columns. In one embodiment, the row and column traces cross in 90° angles to reduce, and potentially minimize, the coupling between the row and column traces. In one embodiment, the row and column traces are on different layers.

An Example of a Full Duplex Communication System

Figure 13:
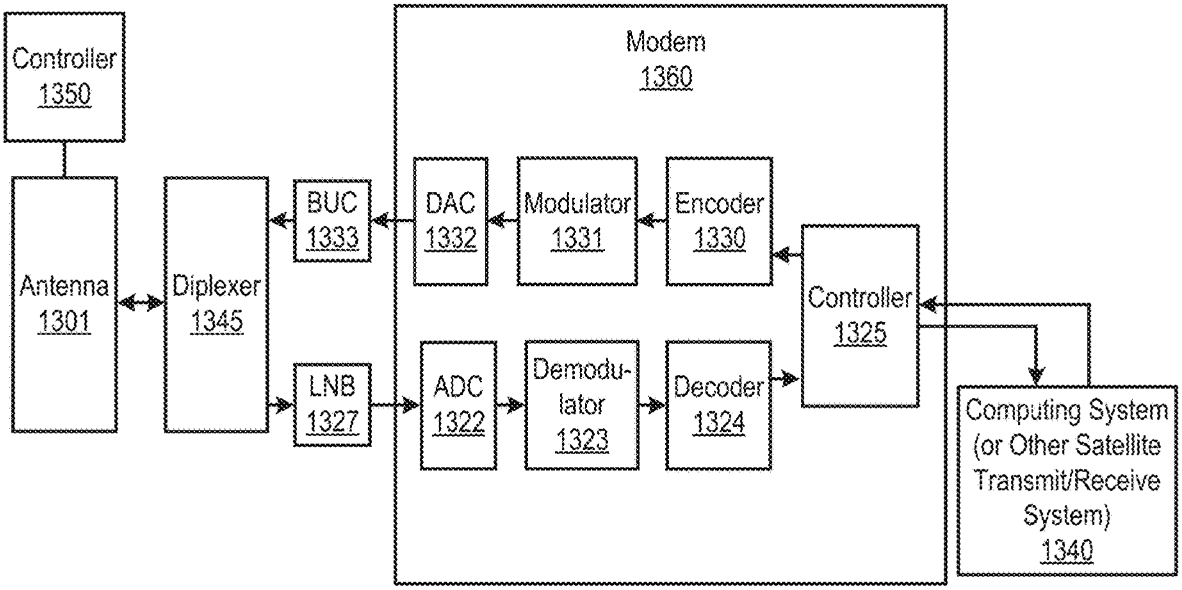
FIG. 13 is a block diagram of one embodiment of a communication system having simultaneous transmit and receive paths.

In another embodiment, the combined antenna apertures are used in a full duplex communication system. FIG. 13 is a block diagram of an embodiment of a communication system having simultaneous transmit and receive paths. While only one transmit path and one receive path are shown, the communication system may include more than one transmit path and/or more than one receive path.

Referring to FIG. 13, antenna 1301 includes two spatially interleaved antenna arrays operable independently to transmit and receive simultaneously at different frequencies as described above. In one embodiment, antenna 1301 is coupled to diplexer 1345. The coupling may be by one or more feeding networks. In one embodiment, in the case of a radial feed antenna, diplexer 1345 combines the two signals and the connection between antenna 1301 and diplexer 1345 is a single broad-band feeding network that can carry both frequencies.

Diplexer 1345 is coupled to a low noise block down converter (LNBs) 1327, which performs a noise filtering function and a down conversion and amplification function in a manner well-known in the art. In one embodiment, LNB 1327 is in an out-door unit (ODU). In another embodiment, LNB 1327 is integrated into the antenna apparatus. LNB 1327 is coupled to a modem 1360, which is coupled to computing system 1340 (e.g., a computer system, modem, etc.).

Modem 1360 includes an analog-to-digital converter (ADC) 1322, which is coupled to LNB 1327, to convert the received signal output from diplexer 1345 into digital format. Once converted to digital format, the signal is demodulated by demodulator 1323 and decoded by decoder 1324 to obtain the encoded data on the received wave. The decoded data is then sent to controller 1325, which sends it to computing system 1340.

Modem 1360 also includes an encoder 1330 that encodes data to be transmitted from computing system 1340. The encoded data is modulated by modulator 1331 and then converted to analog by digital-to-analog converter (DAC) 1332. The analog signal is then filtered by a BUC (up-convert and high pass amplifier) 1333 and provided to one port of diplexer 1345. In one embodiment, BUC 1333 is in an out-door unit (ODU).

Diplexer 1345 operating in a manner well-known in the art provides the transmit signal to antenna 1301 for transmission.

Controller 1350 controls antenna 1301, including the two arrays of antenna elements on the single combined physical aperture.

The communication system would be modified to include the combiner/arbiter described above. In such a case, the combiner/arbiter after the modem but before the BUC and LNB.

Note that the full duplex communication system shown in FIG. 13 has a number of applications, including but not limited to, interne communication, vehicle communication (including software updating), etc.

With reference to FIGS. 1-13, it should be appreciated that other tunable capacitors, tunable capacitance dies, packaged dies, micro-electromechanical systems (MEMS) devices, or other tunable capacitance devices, could be placed into an aperture or elsewhere in variations on the embodiments described herein, for further embodiments. The techniques for mass transfer may be applicable to further embodiments, including placement of various dies, packaged dies or MEMS devices on various substrates for electronically scanned arrays and various further electrical, electronic and electromechanical devices.

There is a number of example embodiments described herein.

Example 1 is an antenna comprising: an antenna aperture having a plurality of RF radiating antenna elements that each include an iris and a solid state device coupled across the iris, wherein the plurality of antenna elements are located in rings with orientation of each of the irises of the antenna elements in at least a portion of each ring rotated with respect to adjacent irises in the portion of said each ring while orientation of corresponding solid state devices is uniform; and a controller coupled to control the array of RF radiating antenna elements to tune RF radiating antenna elements to generate one or more beams using the plurality of RF radiating antenna elements.

Example 2 is the antenna of example 1 that may optionally include that one or more antenna elements of the plurality of RF radiating antenna elements includes a modification in size from other antenna elements of the plurality of antenna elements to shift its resonance frequency in comparison to the other antenna elements.

Example 3 is the antenna of example 2 that may optionally include that the modification makes perimeter length of the irises of the one or more antenna elements different than perimeter length of the irises of the other antenna elements.

Example 4 is the antenna of example 2 that may optionally include that the modification compensates for changes in orientation of irises with respect to adjacently positioned irises in a same ring.

Example 5 is the antenna of example 2 that may optionally include that modification includes one or more notches on one or more sides of at least one iris of the one or more antenna elements.

Example 6 is the antenna of example 2 that may optionally include that modification includes one or more notches on one or more of a top and bottom at least one iris of the one or more antenna elements.

Example 7 is the antenna of example 2 that may optionally include that modification includes one or more bars extending, from one or more sides, into an interior of at least one iris of the one or more antenna elements.

Example 8 is the antenna of example 2 that may optionally include that modification includes longer sides of at least one iris of the one or more antenna elements.

Example 9 is the antenna of example 2 that may optionally include that modification includes position, shape or size of one or more landing pads of at least one iris of the one or more antenna elements.

Example 10 is the antenna of example 1 that may optionally include that one or more antenna elements of the plurality of RF radiating antenna elements includes a resonance frequency adjusted via software to shift its resonance frequency in comparison to the other antenna elements.

Example 11 is the antenna of example 1 that may optionally include that each antenna element of the plurality of antenna elements further comprises a capacitor coupled in series with the solid state device of said each antenna element and that the solid state device comprises a diode.

Example 12 is the antenna of example 1 that may optionally include that each antenna element of the plurality of antenna elements further comprises two or more landing pads coupling its solid state device to its corresponding iris.

Example 13 is the antenna of example 12 that may optionally include that the landing pads are rectangular or circular in shape.

Example 14 is the antenna of example 12 that may optionally include that the landing pads comprises three landing pads, wherein two of the three landing pads are RF landing pads and one of the three landing pads is a direct current (DC) landing pad for transferring a voltage to the solid state device of said each antenna element.

Example 15 is an antenna comprising: an antenna aperture having a plurality of RF radiating antenna elements that each include an iris and a solid state device coupled across the iris, wherein the plurality of antenna elements are located in rings with orientation of each of the irises of the antenna elements in at least a portion of each ring rotated with respect to adjacent irises in the portion of said each ring while orientation of corresponding solid state devices is uniform. One or more antenna elements of the plurality of RF radiating antenna elements includes a modification in size from other antenna elements of the plurality of antenna elements to shift its resonance frequency in comparison to the other antenna elements, and each antenna element of the plurality of antenna elements further comprises three landing pads coupling its solid state device to its corresponding iris, wherein two of the three landing pads are RF landing pads and one of the three landing pads is a direct current (DC) landing pad for transferring a voltage to the solid state device of said each antenna element. The antenna also includes a controller coupled to control the array of RF radiating antenna elements to tune RF radiating antenna elements to generate one or more beams using the plurality of RF radiating antenna elements.

Example 16 is the antenna of example 15 that may optionally include that the modification makes perimeter length of the irises of the one or more antenna elements different than perimeter length of the irises of the other antenna elements.

Example 17 is the antenna of example 15 that may optionally include that the modification compensates for changes in orientation of irises with respect to adjacently positioned irises in a same ring.

Example 18 is the antenna of example 1 that the solid state device comprises a diode.

Example 19 is a method comprising: determining rotations with respect to irises of a plurality of RF radiating antenna elements of an antenna aperture, each of the plurality of RF radiating antenna elements including a solid state device coupled across the iris; modifying one or more irises of one or more of the plurality of RF radiating antenna elements to shift its resonance frequency in comparison to other antenna elements of the plurality of RF radiating antenna elements; and creating the plurality of antenna elements on a surface of a substrate of an antenna aperture.

Example 20 is the method of example 19 that may optionally include that modifying one or more irises of one or more of the plurality of RF radiating antenna elements comprises modifying perimeter length of the irises of the one or more antenna elements different than perimeter length of the irises of the other antenna elements.

Example 21 is the method of example 19 that may optionally include that modifying one or more irises of one or more of the plurality of RF radiating antenna elements comprises compensating for changes in orientation of irises with respect to adjacently positioned irises in a same ring.

Example 22 is the method of example 19 that may optionally include that the solid state device comprises a diode.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

We claim:

1. An antenna comprising:

an antenna aperture having a plurality of RF radiating antenna elements that each include an iris and a solid state device coupled across the iris, wherein the plurality of antenna elements are located in rings with orientation of each of the irises of the antenna elements in at least a portion of each ring rotated with respect to adjacent irises in the portion of said each ring while orientation of corresponding solid state devices is uniform; and a controller coupled to control the array of RF radiating antenna elements to tune RF radiating antenna elements to generate one or more beams using the plurality of RF radiating antenna elements.

2. The antenna of claim 1 wherein one or more antenna elements of the plurality of RF radiating antenna elements includes a modification in size from other antenna elements of the plurality of antenna elements to shift its resonance frequency in comparison to the other antenna elements.

3. The antenna of claim 2 wherein the modification makes perimeter length of the irises of the one or more antenna elements different than perimeter length of the irises of the other antenna elements.

4. The antenna of claim 2 wherein the modification compensates for changes in orientation of irises with respect to adjacently positioned irises in a same ring.

5. The antenna of claim 2 wherein modification includes one or more notches on one or more sides of at least one iris of the one or more antenna elements.

6. The antenna of claim 2 wherein modification includes one or more notches on one or more of a top and bottom at least one iris of the one or more antenna elements.

7. The antenna of claim 2 wherein modification includes one or more bars extending, from one or more sides, into an interior of at least one iris of the one or more antenna elements.

8. The antenna of claim 2 wherein modification includes longer sides of at least one iris of the one or more antenna elements.

9. The antenna of claim 2 wherein modification includes position, shape or size of one or more landing pads of at least one iris of the one or more antenna elements.

10. The antenna of claim 1 wherein one or more antenna elements of the plurality of RF radiating antenna elements includes a resonance frequency adjusted via software to shift its resonance frequency in comparison to the other antenna elements.

11. The antenna of claim 1 wherein each antenna element of the plurality of antenna elements further comprises a capacitor coupled in series with the solid state device of said each antenna element, and wherein the solid state device comprises a diode.

12. The antenna of claim 1 wherein each antenna element of the plurality of antenna elements further comprises two or more landing pads coupling its solid state device to its corresponding iris.

13. The antenna of claim 12 wherein the landing pads are rectangular or circular in shape.

14. The antenna of claim 12 wherein the landing pads comprises three landing pads, wherein two of the three landing pads are RF landing pads and one of the three landing pads is a direct current (DC) landing pad for transferring a voltage to the solid state device of said each antenna element.

15. An antenna comprising:

an antenna aperture having a plurality of RF radiating antenna elements that each include an iris and a solid state device coupled across the iris, wherein the plurality of antenna elements are located in rings with orientation of each of the irises of the antenna elements in at least a portion of each ring rotated with respect to adjacent irises in the portion of said each ring while orientation of corresponding solid state devices is uniform, wherein one or more antenna elements of the plurality of RF radiating antenna elements includes a modification in size from other antenna elements of the plurality of antenna elements to shift its resonance frequency in comparison to the other antenna elements, and further wherein each antenna element of the plurality of antenna elements further comprises three landing pads coupling its solid state device to its corresponding iris, wherein two of the three landing pads are RF landing pads and one of the three landing pads is a direct current (DC) landing pad for transferring a voltage to the solid state device of said each antenna element; and a controller coupled to control the array of RF radiating antenna elements to tune RF radiating antenna elements to generate one or more beams using the plurality of RF radiating antenna elements.

16. The antenna of claim 15 wherein the modification makes perimeter length of the irises of the one or more antenna elements different than perimeter length of the irises of the other antenna elements.

17. The antenna of claim 15 wherein the modification compensates for changes in orientation of irises with respect to adjacently positioned irises in a same ring.

18. The antenna of claim 15 wherein the solid state device comprises a diode.

19. A method comprising:

determining rotations with respect to irises of a plurality of RF radiating antenna elements of an antenna aperture, each of the plurality of RF radiating antenna elements including a solid state device coupled across the iris;

modifying one or more irises of one or more of the plurality of RF radiating antenna elements to shift its resonance frequency in comparison to other antenna elements of the plurality of RF radiating antenna elements; and creating the plurality of antenna elements on a surface of a substrate of an antenna aperture.

20. The method of claim 19 wherein modifying one or more irises of one or more of the plurality of RF radiating antenna elements comprises modifying perimeter length of the irises of the one or more antenna elements different than perimeter length of the irises of the other antenna elements.

21. The method of claim 19 wherein modifying one or more irises of one or more of the plurality of RF radiating antenna elements comprises compensating for changes in orientation of irises with respect to adjacently positioned irises in a same ring.

22. The method of claim 19 wherein the solid state device comprises a diode.

* * * * *